US006249588B1

(12) United States Patent
Amidror et al.

(10) Patent No.: US 6,249,588 B1
(45) **Date of Patent: *Jun. 19, 2001**

(54) METHOD AND APPARATUS FOR AUTHENTICATION OF DOCUMENTS BY USING THE INTENSITY PROFILE OF MOIRE PATTERNS

(75) Inventors: Isaac Amidror, Lausanne; Roger D. Hersch, Epalinges, both of (CH)

(73) Assignee: Ecole Polytechnique Fédérale de Lausanne, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 08/520,334

(22) Filed: Aug. 28, 1995

(51) Int. Cl.[7] ........ G06K 9/00

(52) U.S. Cl. ........ 382/100; 380/54; 283/93

(58) Field of Search ........ 283/72, 17, 93, 283/94; 382/137, 100, 135, 181, 279; 380/54

(56) References Cited

U.S. PATENT DOCUMENTS 4,278,755 * 7/1981 Liu ........ 359/893
4,999,006 * 3/1991 Hamanaka ........ 359/559
5,018,767 * 5/1991 Wicker ........ 283/72

(List continued on next page.)

FOREIGN PATENT DOCUMENTS

1138011 * 12/1968 (GB) ........ B41M/3/14
2 224 240 * 5/1990 (GB) ........ B42D/15/00

OTHER PUBLICATIONS

Völkel et al., "Image Properties of Microlens Array Systems," *MOC'95*, Oct. 18–20, 1995, Hiroshima, Japan, pp. 1–4.*

Amidror, "A Generalized Fourier–based Method for the Analysis of 2D Moiré Envelope–forms in Screen Superpositions," *Journal of Modern Optics*, vol. 41, No. 9, 1994, pp. 1837–1862.*

Stix, "Making Money," *Scientific American*, Mar. 1994, pp. 81, 83.*

Gaskill, Linear Systems, *Fourier Transforms, and Optics*, John Wiley & Sons, Inc., 1978, pp. 112–113, 313–314.*

(List continued on next page.)

*Primary Examiner*—Andrew W. Johns

(57) ABSTRACT

The present invention relates to a new method and apparatus for authenticating documents such as banknotes, trust papers, securities, identification cards, passports, etc. The documents may be printed on any support, including transparent synthetic materials and traditional opaque materials such as paper. This invention is based on moire patterns occuring between superposed dot-screens. By using specially designed basic screen and master screen, where at least the basic screen is comprised in the document, a moire intensity profile of a chosen shape becomes visible in their superposition, thereby allowing the authentication of the document. If instead of the master screen a microlens array is used for the authentication purpose, the document comprising the basic screen may be printed on an opaque reflective support, thereby enabling the visualization of the moire intensity profile by reflection. Automatic document authentication is supported by an apparatus comprising a master screen or a microlens array, an image acquisition means such as a CCD camera and a comparing processor whose task is to compare the acquired moire intensity profile with a prestored reference image. Depending on the match, the document handling device connected to the comparing processor accepts or rejects the document. An important advantage of the present invention is that it can be incorporated into the standard document printing process, so that it offers high security at the same cost as standard state of the art document production.

40 Claims, 13 Drawing Sheets

U.S. PATENT DOCUMENTS

| | | | | |
|---|---|---|---|---|
| 5,275,870 | * | 1/1994 | Halope et al. | 428/199 |
| 5,396,559 | * | 3/1995 | McGrew | 283/17 |
| 5,487,567 | * | 1/1996 | Volpe | 283/72 |
| 5,537,486 | * | 7/1996 | Stratigos et al. | 382/137 |
| 5,995,638 | * | 11/1999 | Amidror et al. | 382/100 |

OTHER PUBLICATIONS

Champeney, *A Handbook of Fourier Theorems*, Cambridge University Press, 1987, pp. 166–167.*

Zygmund, *Trigonometric Series: vol. 1*, Cambridge University Press, 1968, pp. 35–37.*

Ulichney, *Digital Halftoning*, The MIT Press, 1987, pp. 77–127.*

Schalkoff, *Digital Image Processing and Computer Vision*, John Wiley & Sons, Inc., 1989, pp. 279–286.*

* cited by examiner

METHOD AND APPARATUS FOR AUTHENTICATION OF DOCUMENTS BY USING THE INTENSITY PROFILE OF MOIRE PATTERNS

BACKGROUND OF THE INVENTION

Counterfeiting documents such as banknotes is becoming now more than ever a serious problem, due to the availability of high-quality and low-priced color photocopiers and desk-top publishing systems (see, for example, "Making Money", by Gary Stix, Scientific American, March 1994, pp. 81–83).

The present invention is concerned with providing a novel security element and authentication means of enhanced security for banknotes, cheques, credit cards, travel documents and the like, which is even more difficult to counterfeit than present banknotes and security documents.

Various sophisticated means have been introduced in prior art for counterfeit prevention and for authentication of documents. These include the use of special paper, special inks, watermarks, micro-letters, security threads, holograms, etc. Nevertheless, there is still an urgent need to introduce further security elements, which do not considerably increase the cost of the produced documents.

Moire effects have already been used in prior art for the authentication of documents. For example, United Kingdom Pat. No. 1,138,011 (Canadian Bank Note Company) discloses a method which relates to printing on the original document special elements which when counterfeited by means of halftone reproduction show a moire pattern of high contrast. Similar methods are also applied to the prevention of digital photocopying or digital scanning of documents. In all these cases, the presence of moire patterns indicates that the document in question is counterfeit. However, in prior art no advantage is taken of the intentional generation of a moire pattern having a particular intensity profile, whose existance, and whose precise shape, are used as a means of authentication of the document. The approach on which the present invention is based further differs from that of prior art in that it not only provides fulll mastering of the qualitative geometric properties of the generated moire (such as its period and its orientation), but it also permits to determine quantitatively the intensity levels of the generated moire.

SUMMARY OF THE INVENTION

The present invention relates to a new method and apparatus for authenticating documents such as banknotes, trust papers, securities, identification cards, passports, etc. This invention is based on the moire phenomena which are generated between two specially designed dot-screens, at least one of which being printed on the document itself. Each dot-screen consists of a regular lattice of tiny dots, and is charactrized by three parameters: its repetition frequency, its orientation, and its dot shapes. The dot-screens used in the present invention are similar to dot-screens which are used in classical halftoning, but they have specially designed dot shapes, frequencies and orientations, in accordance with the present disclosure. Such dot-screens with simple dot shapes may be produced by classical (optical or electronic) means, which are well known by people skilled in the art. Dot-screens with more complex dot shapes may be produced by means of the method disclosed in co-pending U.S. patent application Ser. No. 08/410,767 filed Mar. 27, 1995 (Ostromoukhov, Hersch).

When the second dot-screen (hereinafter: "the master screen") is layed on top of the first dot-screen (hereinafter: "the basic screen"), in the case where both screens have been designed in accordance with the present disclosure, there appears in the superposition a highly visible repetitive moire pattern of a predefined intensity profile shape. For example, the repetitive moire pattern may consist of any predefined letters, digits or any other preferred symbols (such as the country emblem, the currency, etc.).

As disclosed in U.S. Pat. No. 5,275,870 (Halope et al.) it may be advantageous in the manufacture of long lasting documents or documents which must withstand highly adverse handling to replace paper by synthetic material. Transparent sheets of synthetic materials have been successfully introduced for printing banknotes (for example, Australian banknotes of 5 or 10 Australian Dollars).

The present invention concerns a new method for authenticating documents which may be printed on various supports, including (but not limited to) such transparent synthetic materials. In one embodiment of the present invention, the moire intensity profile shapes can be visualized by superposing a basic screen and a master screen which are both printed on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the basic screen appears on the document itself, and a sheet of microlenses (hereinafter: "microlens array") whose frequency is identical to that of the master screen is used by the human operator or by the apparatus instead of the master screen. An advantage of this third embodiment is that it applies equally well to both transparent support, where the moire is observed by transmittance, and to opaque support, where the moire is observed by reflection. (The term "opaque support" as employed in the present disclosure also includes the case of transparent materials which have been made opaque by an inking process or by a photographic or any other process.)

The fact that moire effects generated between superposed dot-screens are very sensitive to any microscopic variations in the screened layers makes any document protected according to the present invention practically impossible to counterfeit, and serves as a means to easily distinguish between a real document and a falsified one.

It should be noted that the dot-screens which appear on the document itself in accordance with the present invention may be printed on the document like any screened (halftoned) image, within the standard printing process, and therefore no additional cost is incurred in the document production.

Furthermore, the dot-screens printed on the document in accordance with the present invention need not be of a constant intensity level. To the contrary, they may include dots of gradually varying sizes and shapes, and they can be incorporated (or dissimulated) within any halftoned image printed on the document (such as a portrait, landscape, or any decorative motif, which may be different from the motif generated by the moire effect in the superposition). To reflect this fact, the terms "basic screen" and "master screen" used hereinafter will include also cases where the basic screens (respectively: the master screens) are not constant and represent halftoned images. (As is well known in the art, the dot sizes in halftoned images determine the intensity levels in the image: larger dots give darker intensity levels, while smaller dots give brighter intensity levels.)

The terms "print" and "printing" in the present disclosure refer to any process for transferring an image onto a support, including by means of a lithographic, photographic or any other process.

The disclosures "A generalized Fourier-based method for the analysis of 2D moire envelope-forms in screen superpositions" by I. Amidror, Journal of Modem Optics, Vol. 41, 1994, pp. 1837–1862 (hereinafter, "Amidror94") and U.S. patent application Ser. No. 08/410,767 (Ostromoukhov, Hersch) have certain information and content which may relate to the present invention and aid in understanding thereof, they are therefore entirely incorporated herein this disclosure by reference.

BRIEF DESCRIPTION OF THE DRAWINGS

The invention will be further described, by way of example only, with reference to the accompanying figures, in which.

DETAILED DESCRIPTION

Figure 1A:
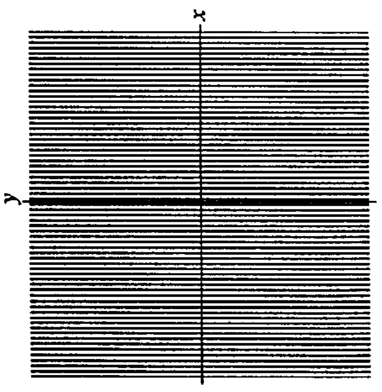
FIGS. 1A and 1B show two line-gratings.

The present invention is based on the intensity profiles of the moire patterns which occur in the superposition of dot-screens. The explanation of these moire intensity profiles is based on the duality between two-dimensional (hereinafter: "2D") periodic images in the (x,y) plane and their 2D spectra in the (u,v) frequency plane through the 2D Fourier transform. For the sake of simplicity, the explanation hereinafter is given for the monochromatic case, although the present invention is not limited only to the monochromatic case, and it relates just as well to the moire intensity profiles in the multichromatic case.

As is known by people skilled in the art, any monochromatic image can be represented in the image domain by a reflectance function, which assigns to each point (x,y) of the image a value between 0 and 1 representing its light reflectance: 0 for black (i.e. no reflected light), 1 for white (i.e. full light reflectance), and intermediate values for in-between shades. In the case of transparencies, the reflectance function is replaced by a transmittance function defined in a similar way. When m monochromatic images are superposed, the reflectance of the resulting image is given by the product of the reflectance functions of the individual images:

$$r(x,y)=r_1(x,y)\ r_2(x,y)\ \ldots\ r_m(x,y) \tag{1}$$

According to a theorem known in the art as "the Convolution theorem", the Fourier transform of the product function is the convolution of the Fourier transforms of the individual functions (see, for example, "Linear Systems, Fourier Transforms, and Optics" by J. D. Gaskill, 1978, p. 314). Therefore, denoting the Fourier transform of each function by the respective capital letter and the 2D convolution by "**", the spectrum of the superposition is given by:

$$R(u,v)=R_1(u,v)\ {}\ R_2(u,v)\ {}\ \ldots\ {**}\ R_m(u,v) \tag{2}$$

In the present disclosure we are basically interested in periodic images, such as line-gratings or dot-screens, and their superpositions. This implies that the spectrum of the image on the (u,v)-plane is not a continuous one but rather consists of impulses, corresponding to the frequencies which appear in the Fourier series decomposition of the image (see, for example, "Linear Systems, Fourier Transforms, and Optics" by J. D. Gaskill, 1978, p. 113). A strong impulse in the spectrum indicates a pronounced periodic component in the original image at the frequency and direction represented by that impulse. In the case of a 1-fold periodic image, such as a line-grating, the spectrum consists of a 1D "comb" of impulses through the origin; in the case of a 2-fold periodic image the spectrum is a 2D "nailbed" of impulses through the origin.

Each impulse in the 2D spectrum is characterized by three main properties: its label (which is its index in the Fourier series development); its geometric location in the spectrum plane (which is called: "the impulse location"), and its amplitude. To the geometric location of any impulse is attached a frequency vector f in the spectrum plane, which connects the spectrum origin with the geometric location of the impulse. In terms of the original image, the geometric location of an impulse in the spectrum determines the frequency and the direction of the corresponding periodic component in the image, and the amplitude of the impulse represents the intensity of that periodic component in the image.

The question of whether or not an impulse in the spectrum represents a visible periodic component in the image strongly depends on properties of the human visual system. The fact that the eye cannot distinguish fine details above a certain frequency (i.e. below a certain period) suggests that the human visual system model includes a low-pass filtering stage. When the frequencies of the original image elements are beyond the limit of frequency visibility, the eye can no longer see them; but if a strong enough impulse in the spectrum of the image superposition falls closer to the spectrum origin, then a moire effect becomes visible in the superposed image.

According to the Convolution theorem (Eqs. (1), (2)), when m line-gratings are superposed in the image domain, the resulting spectrum is the convolution of their individual spectra. This convolution of combs (or nailbeds) can be seen as an operation in which frequency vectors from the individual spectra are added vectorially, while the corresponding impulse amplitudes are multiplied. More precisely, each impulse in the spectrum-convolution is generated during the convolution process by the contribution of one impulse from each individual spectrum: its location is given by the sum of their frequency vectors, and its amplitude is given by the product of their amplitudes. This permits us to introduce an indexing method for denoting each of the impulses of the spectrum-convolution in a unique, unambiguous way. The general impulse in the spectrum-convolution will be denoted the "$(k_1, k_2, \ldots, k_m)$-impulse," where m is the number of superposed gratings, and each integer $k_i$ is the index (harmonic), within the comb (the Fourier series) of the i-th spectrum, of the impulse that this i-th spectrum contributed to the impulse in question in the convolution. Using this formal notation the geometric location of the general $(k_1,k_2, \ldots, k_m)$-impulse in the spectrum-convolution is given by the vectorial sum (or linear combination):

$$f_{k_1,k_2,\ldots,k_m}=k_1f_1+k_2f_2+\ldots+k_mf_m \quad (3)$$

and the impulse amplitude is given by:

$$a_{k_1,k_2,\ldots,k_m}=a^{(1)}_{k_1}a^{(2)}_{k_2}\ldots a^{(m)}_{k_m} \quad (4)$$

where $f_i$ denotes the frequency vector of the fundamental impulse in the spectrum of the i-th grating, and $k_if_i$ and $a^{(i)}_{k_i}$ are respectively the frequency vector and the amplitude of the $k_i$-th harmonic impulse in the spectrum of the i-th grating.

A $(k_1,k_2, \ldots, k_m)$-impulse of the spectrum-convolution which falls close to the spectrum origin, within the range of visible frequencies, represents a moire effect in the superposed image. See for example the moire effect in the two-grating superposition of FIG. 1C, which is represented in the spectrum convolution by the (1,−1)-impulse shown by 11 in FIG. 1F (obviously, this impulse is also accompanied by its respective symmetrical twin 12 to the opposite side of the spectrum origin, namely, the (−1,1)-impulse. The range of visible frequencies is represented in FIG. 1F by the circle 10). We call the m-grating moire whose fundamental impulse is the $(k_1,k_2, \ldots, k_m)$-impulse in the spectrum-convolution a "$(k_1,k_2, \ldots, k_m)$-moire"; the highest absolute value in the index-list is called the "order" of the moire. For example, the 2-grating moire effect of FIGS. 1C and 1F is a (1,−1)-moire, which is a moire of order 1. It should be noted that in the case of doubly periodic images, such as in dot-screens, each superposed image contributes two perpendicular frequency vectors to the spectrum, so that in Eqs. (3) and (4) m represents twice the number of superposed images.

The vectorial sum of Eq. (3) can also be written in terms of its Cartesian components. If $f_i$ are the frequencies of the m original gratings and $\theta_i$ are the angles that they form with the positive horizontal axis, then the coordinates $(f_u,f_v)$ of the $(k_1,k_2, \ldots, k_m)$-impulse in the spectrum-convolution are given by:

$$f_u k_1, k_2, \ldots, k_m=k_1f_1 \cos\theta_1+k_2f_2 \cos\theta_2+\ldots+k_mf_m \cos\theta_m$$

$$f_v k_1, k_2, \ldots, k_m=k_1f_1 \sin\theta_1+k_2f_2 \sin\theta_2+\ldots+k_mf_m \sin\theta_m \quad (5)$$

Therefore, the frequency, the period and the angle of the $(k_1,k_2, \ldots, k_m)$-impulse (and of the $(k_1,k_2, \ldots, k_m)$-moire it represents) are given by the length and the direction of the vector $f_{k_1,k_2,\ldots,k_m}$, follows:

$$f=\sqrt{f_u^2+f_v^2} \qquad T=1/f \qquad \varphi=\arctan(f_v/f_u) \quad (6)$$

Note that in the special case of the (1,−1)-moire between m=2 gratings, where a moire effect occurs due to the vectorial sum of the frequency vectors $f_1$ and $-f_2$, these formulas are reduced to the well-known formulas of the period and angle of the moire effect between two gratings:

$$T_M=\frac{T_1T_2}{\sqrt{T_1^2+T_2^2-2T_1T_2\cos\alpha}} \quad (7)$$

$$\sin\varphi_M=\frac{T_1\sin\alpha}{\sqrt{T_1^2+T_2^2-2T_1T_2\cos\alpha}}$$

(where $T_1$ and $T_2$ are the periods of the two original gratings and $\alpha$ is the angle difference between them, $\theta_2-\theta_1$). When $T_1=T_2$ this is further simplified into the well-known formulas:

$$T_M=\frac{T}{2\sin(\alpha/2)} \qquad \varphi_M=90^\circ-\alpha/2 \quad (8)$$

The moire patterns obtained in the superposition of periodic structures can be described at two different levels. The first, basic level only deals with geometric properties within the (x,y)-plane, such as the periods and angles of the original images and of their moire patterns. The second level also takes into account the amplitude properties, which can be added on top of the planar 2D descriptions of the original structures or their moire patterns as a third dimension, z=g(x,y), showing their intensities or gray-level values. (In terms of the spectral domain, the first level only considers the impulse locations (or frequency vectors) within the (u,v)-plane, while the second level also considers the amplitudes of the impulses.) This 3D representation of the shape and the intensity variations of the moire pattern is called "the moire intensity profile".

The present disclosure is based on the analysis, using the Fourier approach, of the intensity profiles of moire patterns which are obtained in the superposition of periodic layers such as line-gratings, dot-screens, etc. This analysis is described in the following section for the simple case of line-grating superpositions, and then, in the next section, for the more complex case of dot-screen superpositions.

Moires Between Superposed Line-gratings

Figure 1B:
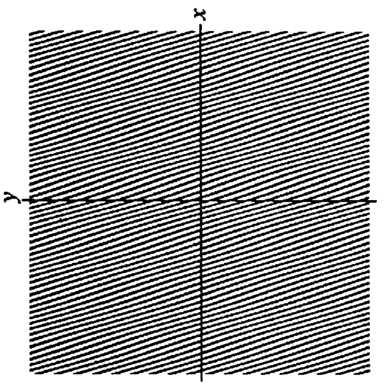
Figure 1C:
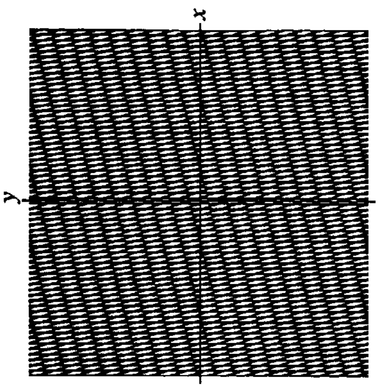
FIG. 1C shows the superposition of the two line-gratings of FIGS. 1A and 1B, where the (1,−1)-moire is clearly seen.
Figure 1D:
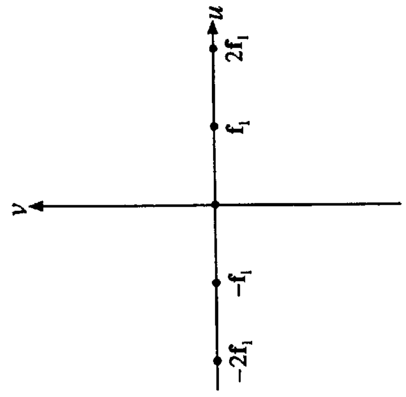
FIGS. 1D and 1E show the spectra of the line-gratings of FIGS. 1A and 1B, respectively.
Figure 1E:
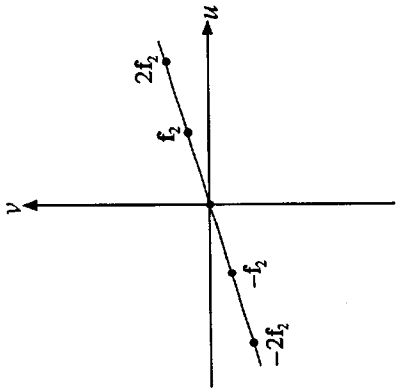
Figure 1F:
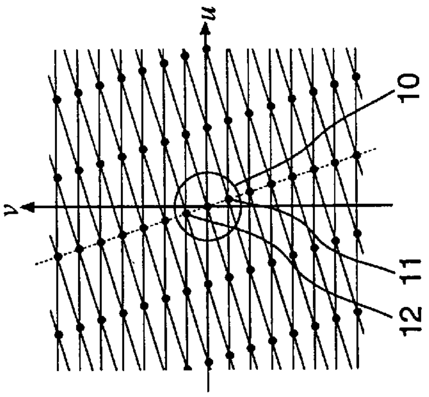
FIG. 1F shows the spectrum of the superposition, which is the convolution of the spectra of FIGS. 1D and 1E.
Figure 1G:
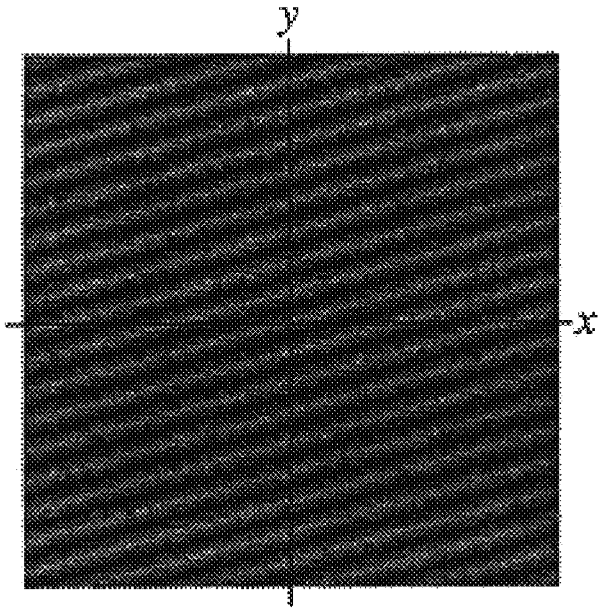
FIG. 1G shows the intensity profile of the (1,−1)-moire of FIG. 1C.
Figure 1H:
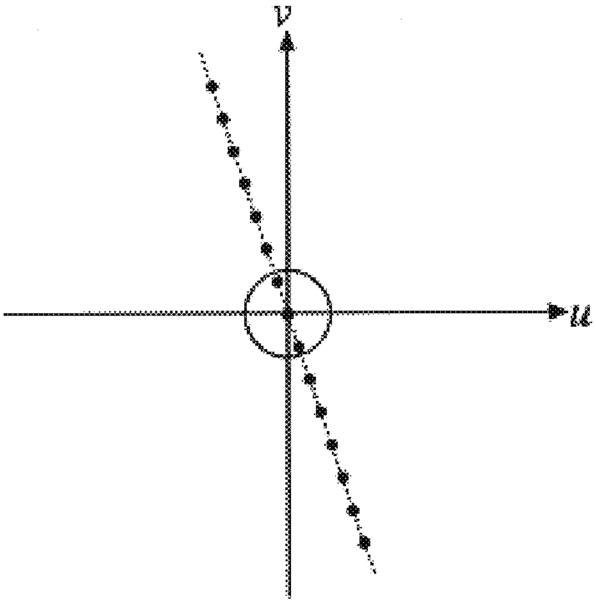
FIG. 1H shows the spectrum of the isolated (1,−1)-moire comb after its extraction from the spectrum of the superposition.

Assume that we are given two line-gratings (like in FIG. 1A and FIG. 1B). The spectrum of each of the line-gratings (see FIG. 1D and FIG. 1E, respectively) consists of an infinite impulse-comb, in which the amplitude of the n-th impulse is given by the coefficient of the n-harmonic term in the Fourier series development of that line-grating. When we superpose (i.e. multiply) two line-gratings the spectrum of the superposition is, according to the Convolution theorem, the convolution of the two original combs, which gives an oblique nailbed of impulses (see FIG. 1F). Each moire which appears in the grating superposition is represented in the spectrum of the superposition by a comb of impulses through the origin which is included in the nailbed. If a moire is visible in the superposition, it means that in the spectral domain the fundamental impulse-pair of the moire-comb (11 and 12 in FIG. 1F) is located close to the spectrum origin, inside the range of visible frequencies (10); this impulse-pair determines the period and the direction of the moire. Now, by extracting from the spectrum-convolution only this infinite moire-comb (FIG. 1H) and taking its inverse Fourier transform, we can reconstruct, back in the image domain, the isolated contribution of the moire in question to the image superposition; this is the intensity profile of the moire (see FIG. 1G).

We denote by $c_n$ the amplitude of the n-th impulse of the moire-comb. If the moire is a $(k_1,k_2)$-moire, the fundamental impulse of its comb is the $(k_1,k_2)$-impulse in the spectrum-convolution, and the n-th impulse of its comb is the $(nk_1, nk_2)$-impulse in the spectrum-convolution. Its amplitude is given by:

$$c_n=\alpha_{nk_1,nk_2}$$

and according to Eq. (4):

$$c_n=\alpha^{(1)}_{nk_1}\alpha^{(2)}_{nk_2}$$

where $\alpha^{(1)}_i$ and $\alpha^{(2)}_i$ are the respective impulse amplitudes from the combs of the first and of the second line-gratings. In other words:

Result 1: The impulse amplitudes of the moire-comb in the spectrum-convolution are determined by a simple term-by-term multiplication of the combs of the original superposed gratings (or subcombs thereof, in case of higher order moires).

For example, in the case of a (1,−1)-moire (as in FIG. 1F) the amplitudes of the moire-comb impulses are given by: $c_n=\alpha_{n,-n}=\alpha^{(1)}_n\alpha^{(2)}_{-n}$.

However, this term-by-term multiplication of the original combs (i.e. the term-by-term product of the Fourier series of the two original gratings) can be interpreted according to a theorem, which is the equivalent of the Convolution theorem in the case of periodic functions, and which is known in the art as the T-convolution theorem (see "Fourier theorems" by Champeney, 1987, p. 166; "Trigonometric Series Vol. 1" by Zygmund, 1968, p. 36):

T-convolution theorem: Let $f(x)$ and $g(x)$ be functions of period T integrable on a one-period interval (0,T), and let $\{F_n\}$ and $\{G_n\}$ (for n=0, ±1, ±2, . . . ) be their Fourier series coefficients. Then the function:

$$h(x)=\frac{1}{T}\int_T f(x-x')g(x')dx' \quad (9)$$

(where $$\int_T$$

means integration over a one-period interval), which is called "the T-convolution of $f$ and g" and denoted by "f*g," is also periodic with the same period T and has Fourier series coefficients $\{H_n\}$ given by: $H_n=F_nG_n$ for all integers n.

The T-convolution theorem can be rephrased in a more illustrative way as follows: If the spectrum of $f(x)$ is a comb with fundamental frequency of 1/T and impulse amplitudes $\{F_n\}$, and the spectrum of g(x) is a comb with the same fundamental frequency and impulse amplitudes $\{G_n\}$, then the spectrum of the T-convolution $f$*g is a comb with the same fundamental frequency and with impulse amplitudes of $\{F_nG_n\}$. In other words, the spectrum of the T-convolution of the two periodic images is the product of the combs in their respective spectra.

Using this theorem, the fact that the comb of the (1,−1)-moire in the spectral domain is the term-by-term product of the combs of the two original gratings (Result 1) can be interpreted back in the image domain as follows:

The intensity profile of the (1,−1)-moire generated in the superposition of two line-gratings with identical periods T is the T-convolution of the two original line-gratings. If the periods are not identical, they must be first normalized by stretching and rotation transformations, as disclosed in Appendix A of "Amidror94." This result can be further generalized to also cover higher-order moires:

Result 2: The intensity profile of the general $(k_1,k_2)$-moire generated in the superposition of two line-gratings with periods $T_1$ and $T_2$ and an angle difference $\alpha$ can be seen from the image-domain point of view as a normalized T-convolution of the images belonging to the $k_1$-subcomb of the first grating and to the $k_2$-subcomb of the second grating. In more detail, this can be seen as a 3-stage process:

(1) Extracting the $k_1$-subcomb (i.e. the partial comb which contains only every $k_1$-th impulse) from the comb of the first original line-grating, and similarly, extracting the $k_2$-subcomb from the comb of the second original grating.

(2) Normalization of the two subcombs by linear stretching- and rotation-transformations in order to bring each of them to the period and the direction of the moire, as they are determined by Eq. (3).

(3) T-convolution of the images belonging to the two normalized subcombs. (This can be done by multiplying the normalized subcombs in the spectrum and taking the inverse Fourier transform of the product).

In conclusion, the T-convolution theorem enables us to present the extraction of the moire intensity profile between two gratings either in the image or in the spectral domains. From the spectral point of view, the intensity profile of any $(k_1,k_2)$-moire between two superposed (=multiplied) gratings is obtained by extracting from their spectrum-convolution only those impulses which belong to the $(k_1, k_2)$-moire comb, thus reconstructing back in the image domain only the isolated contribution of this moire to the image of the superposition. On the other hand, from the point of view of the image domain, the intensity profile of any $(k_1,k_2)$-moire between two superposed gratings is a normalized T-convolution of the images belonging to the $k_1$-subcomb of the first grating and to the $k_2$-subcomb of the second grating.

Moires Between Superposed Dot-screens

The moire extraction process described above for the superposition of line-gratings can be generalized to the superposition of doubly periodic dot-screens, where the moire effect obtained in the superposition is really of a 2D nature:

Let $f(x,y)$ be a doubly periodic image (for example, $f(x,y)$ may be a dot-screen which is periodic in two orthogonal directions, $\theta_1$ and $\theta_1+90°$, with an identical period $T_1$ in both directions). Its spectrum F(u,v) is a nailbed whose impulses are located on a lattice $L_1(u,v)$, rotated by the same angle $\theta_1$ and with period of $1/T_1$; the amplitude of a general $(k_1,k_2)$-impulse in this nailbed is given by the coefficient of the $(k_1,k_2)$-harmonic term in the 2D Fourier series development of the periodic function $f(x,y)$.

The lattice $L_1(u,v)$ can be seen as the 2D support of the nailbed F(u,v) on the plane of the spectrum, i.e. the set of all the nailbed impulse-locations. Its unit points (0,1) and (1,0) are situated in the spectrum at the geometric locations of the two perpendicular fundamental impulses of the nailbed F(u,v), whose frequency vectors are $f_1$ and $f_2$. Therefore, the location $w_1$ in the spectrum of a general point $(k_1,k_2)$ of this lattice is given by a linear combination of $f_1$ and $f_2$ with the integer coefficients $k_1$ and $k_2$; and the location $w_2$ of the perpendicular point $(-k_2,k_1)$ on the lattice can also be expressed in a similar way:

$$w_1=k_1f_1+k_2f_2$$

$$w_2=-k_2f_1+k_1f_2 \qquad (10)$$

Let g(x,y) be a second doubly periodic image, for example a dot-screen whose periods in the two orthogonal directions $\theta_2$ and $\theta_2$ +90° are $T_2$. Again, its spectrum G(u,v) is a nailbed whose support is a lattice $L_2(u,v)$, rotated by $\theta_2$ and with a period of $1/T_2$. The unit points (0,1) and (1,0) of the lattice $L_2(u,v)$ are situated in the spectrum at the geometric locations of the frequency vectors $f_3$ and $f_4$ of the two perpendicular fundamental impulses of the nailbed G(u,v). Therefore the location $w_3$ of a general point $(k_3,k_4)$ of this lattice and the location $w_4$ of its perpendicular twin $(-k_4,k_3)$ are given by:

$$w_3=k_3f_3+k_4f_4$$

$$w_4=-k_4f_3+k_3f_4 \qquad (11)$$

Assume now that we superpose (i.e. multiply) $f(x,y)$ and g(x,y). According to the Convolution theorem (Eqs. (1) and (2)) the spectrum of the superposition is the convolution of the nailbeds F(u,v) and G(u,v); this means that a centered copy of one of the nailbeds is placed on top of each impulse of the other nailbed (the amplitude of each copied nailbed being scaled down by the amplitude of the impulse on top of which it has been copied).

Figure 2A:
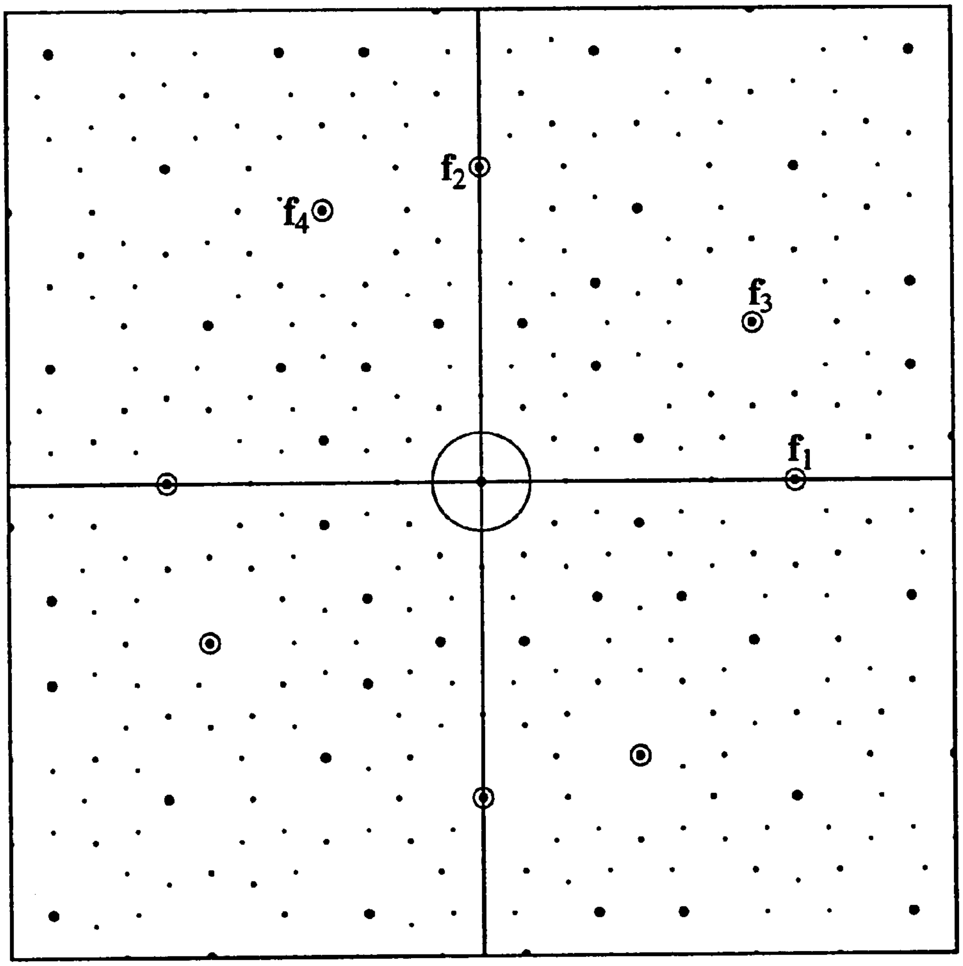
FIGS. 2A, 2B and 2C show the spectrum of the superposition of two dot-screens with identical frequencies, and with angle differences of 30 degrees (in FIG. 2A), 34.5 degrees (in FIG. 2B) and 5 degrees (in FIG. 2C)
Figure 2B:
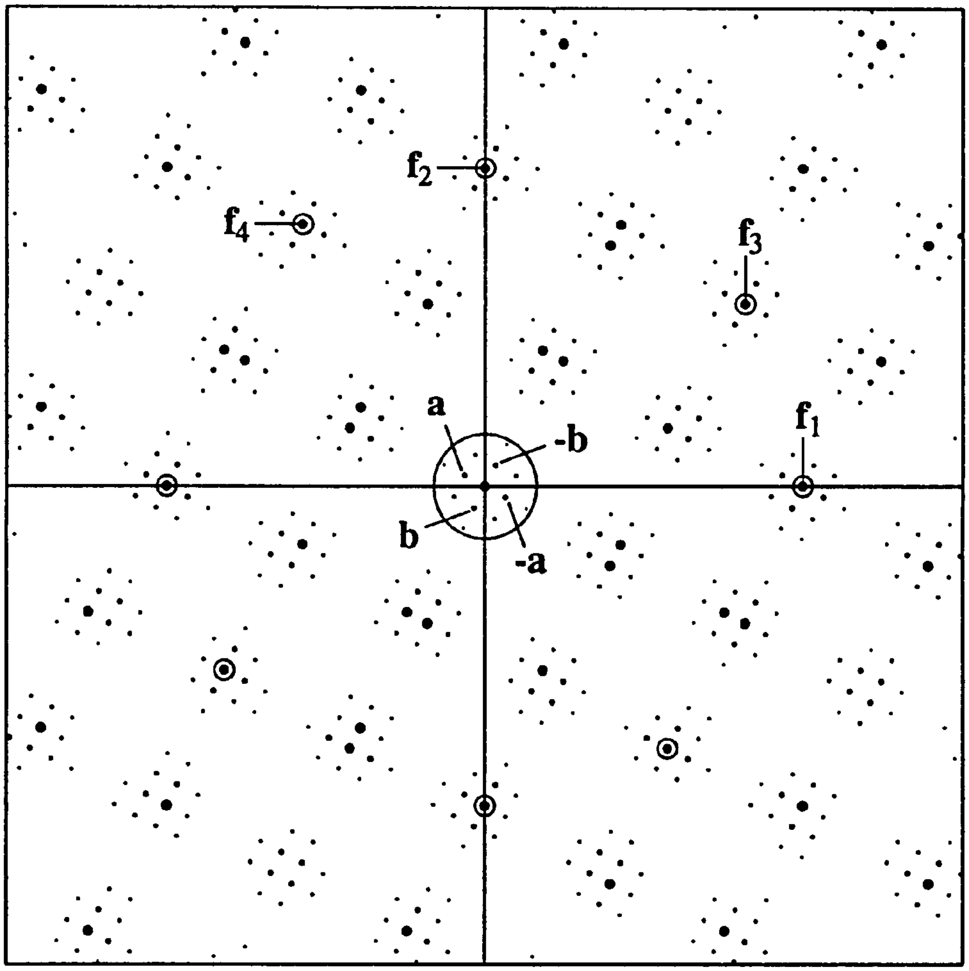
Figure 2C:
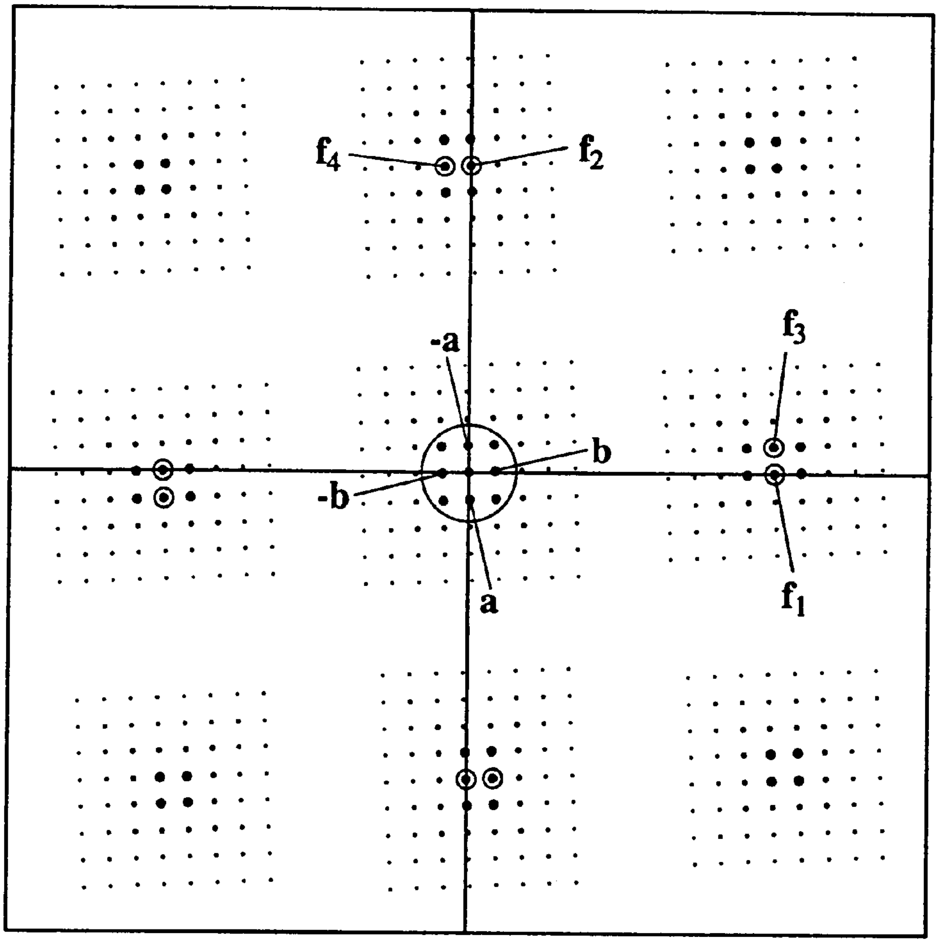

FIG. 2A shows the locations of the impulses in such a spectrum-convolution in a typical case where no moire effect is visible in the superposition (note that only impulses up to the third harmonic are shown). FIGS. 2B and 2C, however, show the impulse locations received in the spectrum-convolution in typical cases in which the superposition does generate a visible moire effect, say a $(k_1,k_2,k_3,k_4)$-moire. As we can see, in these cases the DC impulse at the spectrum origin is closely surrounded by a whole cluster of impulses. The cluster impulses closest to the spectrum origin, within the range of visible frequencies, are the $(k_1,k_2,k_3,k_4)$-impulse of the convolution, which is the fundamental impulse of the moire in question, and its perpendicular counterpart, the $(-k_2,k_1,-k_4,k_3)$-impulse, which is the fundamental impulse of the moire in the perpendicular direction. (Obviously, each of these two impulses is also accompanied by its respective symmetrical twin to the opposite side of the origin). The locations (frequency vectors) of these four impulses are marked in FIGS. 2B and 2C by: a, b, −a and −b. Note that in FIG. 2B the impulse-cluster belongs to the second order (1,2,−2,−1)-moire, while in FIG. 2C the impulse-cluster belongs to the first order (1,0,−1,0)-moire, and consists of another subset of impulses from the spectrum-convolution.

The impulse-cluster surrounding the spectrum origin is in fact a nailbed whose support is the lattice which is spanned by a and b, the locations of the fundamental moire impulses $(k_1,k_2,k_3,k_4)$ and $(-k_2,k_1,-k_4,k_3)$. This infinite impulse-cluster represents in the spectrum the 2D $(k_1,k_2,k_3,k_4)$-moire, and its basis vectors a and b (the locations of the fundamental impulses) determine the period and the two perpendicular directions of the moire. This impulse-cluster is the 2D generalization of the 1D moire-comb that we had in the case of line-grating superpositions. We will call the infinite impulse-cluster of the $(k_1,k_2,k_3,k_4)$-moire the "$(k_1,k_2,k_3,k_4)$-cluster," and we will denote it by: "$M_{k_1,k_2,k_3,k_4}(u,v)$." If we extract from the spectrum of the superposition only the impulses of this infinite cluster, we get the 2D Fourier series development of the intensity profile of the $(k_1,k_2,k_3,k_4)$-moire; in other words, the amplitude of the (i,j)-th impulse of the cluster is the coefficient of the (i,j)-harmonic term in the Fourier series development of the moire intensity profile. By taking the inverse 2D Fourier transform of this extracted cluster we can analytically reconstruct in the image domain the intensity profile of this moire. If we denote the intensity profile of the $(k_1,k_2,k_3,k_4)$-moire between the superposed images $f(x,y)$ and g(x,y) by "$m_{k_1,k_2,k_3,k_4}(x,y)$," we therefore have:

$$m_{k_1,k_2,k_3,k_4}(x,y)=f^{-1}[M_{k_1,k_2,k_3,k_4}(u,v)] \qquad (12)$$

The intensity profile of the $(k_1,k_2,k_3, k_4)$-moire between the superposed images $f(x,y)$ and g(x,y) is therefore a function $m_{k_1,k_2,k_3,k_4}(x,y)$ in the image domain whose value at each point (x,y) indicates quantitatively the intensity level of the moire in question, i.e. the particular intensity contribution of this moire to the image superposition. Note that although this moire is visible both in the image superposition $f(x,y)\cdot g(x,y)$ and in the extracted moire intensity profile $m_{k_1,k_2,k_3,k_4}(x,y)$, the latter does not contain the fine structure of the original images $f(x,y)$ and g(x,y) but only the isolated form of the extracted $(k_1,k_2,k_3,k_4)$-moire. Moreover, in a single image superposition $f(x,y)\cdot g(x,y)$ there may be visible several different moires simultaneously; but each of them will have a different moire intensity profile $m_{k_1,k_2,k_3,k_4}(x,y)$ of its own.

Let us now find the expressions for the location, the index and the amplitude of each of the impulses of the $(k_1,k_2,k_3,k_4)$-moire cluster. If a is the frequency vector of the $(k_1,k_2,k_3,k_4)$-impulse in the convolution and b is the orthogonal frequency vector of the $(-k_2,k_1,-k_4,k_3)$-impulse, then we have:

$$a=k_1f_1+k_2f_2+f_3f_3+l_4f_4$$

$$b=k_2f_1+k_1f_2-k_4f_3+k_3f_4 \qquad (13)$$

The index-vector of the (i,j)-th impulse in the $(k_1,k_2,k_3,k_4)$-moire cluster is, therefore:

$$i(k_1,k_{,2},k_3,k_4)+j(-k_2,k_1,-k_4,k_3)=(ik_1-jk_2,\ ik_2+jk_1,\ ik_3-jk_4,\ ik_4+jk_3). \qquad (14)$$

And furthermore, since the geometric locations of the $(k_1,k_2,k_3,k_4)$- and $(-k_2,k_1,-k_4,k_3)$-impulses are a and b (they are the basis vectors which span the lattice $L_m(u,v)$, the support of the moire-cluster), the location of the (i,j)-th impulse within this moire-cluster is given by the linear combination ia+jb:

$$ia+jb=(ik_1-jk_2)f_1+(ik_2+jk_1)f_2+(ik_3-jk_4)f_3+(ik_4+jk_3)f_4 \qquad (15)$$

As we can see, the $(k_1,k_2,k_3,k_4)$-moire cluster is the infinite subset of the full spectrum-convolution which only contains those impulses whose indices are given by Eq. (14), for all integer i,j.

Finally, the amplitude $c_{i,j}$ of the (i,j)-th impulse in the $(k_1,k_2,k_3,k_4)$-moire cluster is given by:

$$c_{i,j}=\alpha_{ik_1-jk_2,\ ik_2+jk_1,\ ik_3-jk_4,\ ik_4+jk_3} \tag{16}$$

and according to Eq. (4) we obtain:

$$c_{i,j}=\alpha^{(1)}_{ik_1-jk_2}\alpha^{(2)}_{ik_2+jk_1}\alpha^{(3)}_{ik_3-jk_4}\alpha^{(4)}_{ik_4+jk_3} \tag{17}$$

But since we are dealing here with the superposition of two orthogonal layers (dot-screens) rather than with a superposition of four independent layers (gratings), each of the two 2D layers may be inseparable. Consequently, we should rather group the four amplitudes in Eq. (17) into pairs, so that each element in the expression corresponds to an impulse amplitude in the nailbed F(u,v) or in the nailbed G(u,v):

$$c_{i,j}=\alpha^{(f)}_{ik_1-jk_2,\ ik_2+jk_1}\alpha^{(g)}_{ik_3-jk_4,\ ik_4+jk_3} \tag{18}$$

This means that the amplitude $c_{i,j}$ of the (i,j)-th impulse in the $(k_1,k_2,k_3,k_4)$-moire cluster is the product of the amplitudes of its two generating impulses: the $(ik_1-jk_2,\ ik_2+jk_1)$-impulse of the nailbed F(u,v) and the $(ik_3-jk_4,\ ik_4+jk_3)$-impulse of the nailbed G(u,v). This can be interpreted more illustratively in the following way:

Let us call "the $(k_1,k_2)$-subnailbed of the nailbed F(u,v)" the partial nailbed of F(u,v) whose fundamental impulses are the $(k_1,k_2)$- and the $(-k_2,k_1)$-impulses of F(u,v); its general (i,j)-impulse is the $i(k_1,k_2)+j(-k_2,k_1)=(ik_1-jk_2,\ ik_2+jk_1)$-impulse of F(u,v). Similarly, let the $(k_3,k_4)$-subnailbed of the nailbed G(u,v) be the partial nailbed of G(u,v) whose fundamental impulses are the $(k_3,k_4)$- and the $(-k_4,k_3)$-impulses of G(u,v); its general (i,j)-impulse is the $(ik_3-jk_4,\ ik_4+jk_3)$-impulse of G(u,v). It therefore follows from Eq. (18) that the amplitude of the (i,j)-impulse of the nailbed of the $(k_1,k_2,k_3,k_4)$-moire in the spectrum-convolution is the product of the (i,j)-impulse of the $(k_1,k_2)$-subnailbed of F(u,v) and the (i,j)-impulse of the $(k_3,k_4)$-subnailbed of G(u,v). This means that:

Result 3: (2D generalization of Result 1): The impulse amplitudes of the $(k_1,k_2,k_3,k_4)$-moire cluster in the spectrum-convolution are the term-by-term product of the $(k_1,k_2)$-subnailbed of F(u,v) and the $(k_3,k_4)$-subnailbed of G(u,v).

For example, in the case of the simplest first-order moire between the dot-screens $f(x,y)$ and $g(x,y)$, the (1,0,−1,0)-moire (see FIG. 2C), the amplitudes of the moire-cluster impulses in the spectrum-convolution are given by: $c_{i,j}=\alpha^{(f)}_{i,j}\alpha^{(g)}_{-i,-j}$. This means that in this case the moire-cluster is simply a term-by-term product of the nailbeds F(u,v) and G(−u,−v) of the original images $f(x,y)$ and g(−x,−y). For the second-order (1,2,−2,−1)-moire (see FIG. 2B) the amplitudes of the moire-cluster impulses are: $c_{i,j}=\alpha^{(f)}_{i-2j,2i+j}\alpha^{(g)}_{-2i+j,-i-2j}$.

Now, since we also know the exact locations of the impulses of the moire-cluster (according to Eq. (14)), the spectrum of the isolated moire in question is fully determined, and given analytically by:

$$M_{k_1,k_2,k_3,k_4}(u,v)=\sum_{i=-\infty}^{\infty}\sum_{j=-\infty}^{\infty}c_{i,j}\delta_{ia+jb}(u,v) \tag{19}$$

where $\delta_f(u,v)$ denotes an impulse located at the frequency-vector f in the spectrum. Therefore, we can reconstruct the intensity profile of the moire, back in the image domain, by formally taking the inverse Fourier transform of the isolated moire cluster. Practically, this can be done either by interpreting the moire cluster as a 2D Fourier series, and summing up the corresponding sinusoidal functions (up to the desired precision); or, more efficiently, by approximating the continuous inverse Fourier transform of the isolated moire-cluster by means of the inverse 2D discrete Fourier transform (using FFT).

Like in the case of grating superposition, the spectral domain term-by-term multiplication of the moire-clusters can be interpreted directly in the image domain by means of the 2D version of the T-convolution theorem:

2D T-convolution theorem: Let $f(x,y)$ and g(x,y) be doubly periodic functions of period $T_x$, $T_y$ integrable on a one-period interval ($0\leqq x\leqq T_x$, $0\leqq y\leqq T_y$), and let $\{F_{m,n}\}$ and $\{G_{m,n}\}$ (for m,n=0, ±1, ±2, . . . ) be their 2D Fourier series coefficients. Then the function:

$$h(x,y)=\frac{1}{T_xT_y}\int\int_{T_xT_y}f(x-x',y-y')g(x',y')dx'dy' \tag{20}$$

(where $$\int\int_{T_xT_y}$$

means integration over a one-period interval), which is called "the T-convolution off and g" and denoted by "$f$**g," is also doubly periodic with the same periods $T_x$, $T_y$ and has Fourier series coefficients $\{H_{m,n}\}$ given by: $H_{m,n}=F_{m,n}G_{m,n}$ for all integers m,n.

According to this theorem we have the following result, which is the generalization of Result 2 to the general 2D case:

Result 4: The intensity profile of the $(k_1,k_2,k_3,k_4)$-moire in the superposition of $f(x,y)$ and g(x,y) is a T-convolution of the (normalized) images belonging to the $(k_1,k_2)$-subnailbed of F(u,v) and the $(k_3,k_4)$-subnailbed of G(u,v). Note that, before applying the T-convolution theorem, the images must be normalized by stretching and rotation transformations, to fit to the actual period and angle of the moire, as determined by Eq. (3) (or by the lattice $L_M(u,v)$ of the $(k_1,k_2,k_3,k_4)$-moire, which is spanned by the fundamental vectors a and b). As shown in Appendix A in "Amidror94," normalizing the periodic images by stretching and rotation does not affect their impulse amplitudes in the spectrum, but only the impulse locations.

These results can be easily generalized to any $(k_1, \ldots, k_m)$-moire between any number of superposed images by a simple, straightforward extension of this procedure.

A Preferred Case: The (1,0,−1,0)-moire

A preferred moire for the present invention relates to the special case of the (1,0,−1,0)-moire. A (1,0,−1,0)-moire becomes visible in the superposition of two dot-screens when both dot-screens have identical or almost identical frequencies and an angle difference $\alpha$ which is close to 0 degrees (this is illustrated, in the spectral domain, by FIG. 2C). As shown in the example following Result 3, in the special case of the (1,0,−1,0)-moire the impulse amplitudes of the moire-cluster are simply a term-by-term product of the nailbeds F(u,v) and G(−u,−v) themselves: $c_{i,j}=\alpha^{(f)}_{i,j}\alpha^{(g)}_{-i,-j}$. Since the impulse locations of this moire-cluster are also known, according to Eq. (3), we can obtain the intensity profile of the (1,0,−1,0)-moire by extracting this moire-cluster from the full spectrum-convolution, and taking its inverse Fourier transform.

However, according to Result 4, the intensity profile of the (1,0,−1,0)-moire can also be interpreted directly in the image domain: in this special case the moire intensity profile is simply a T-convolution of the original images $f(x,y)$ and $g(-x,-y)$ (after undergoing the necessary stretching and rotations to make their periods, or their supporting lattices in the spectrum, coincide).

Figure 3:
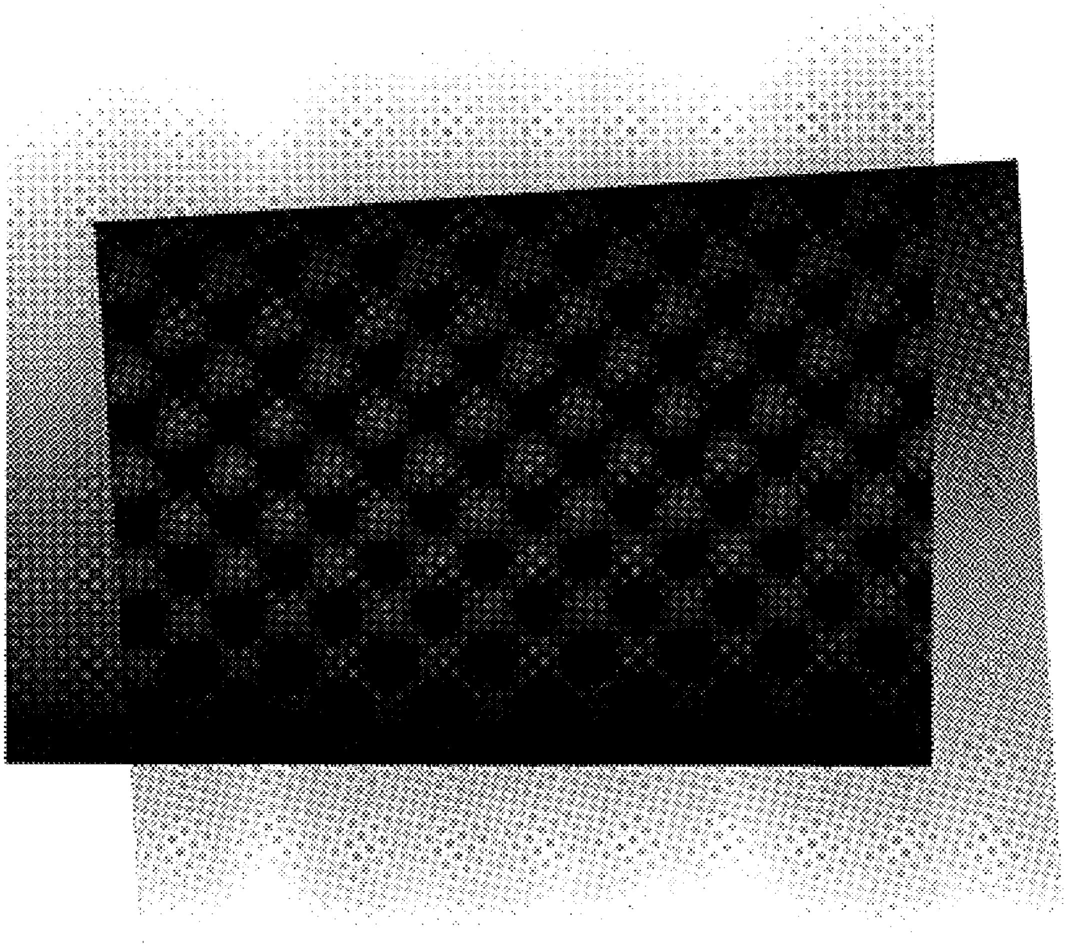
FIG. 3 shows the moire intensity profiles obtained in the superposition of a dot-screen comprising circular black dots of varying sizes and a dot-screen comprising triangular black dots of varying sizes.
Figure 4:
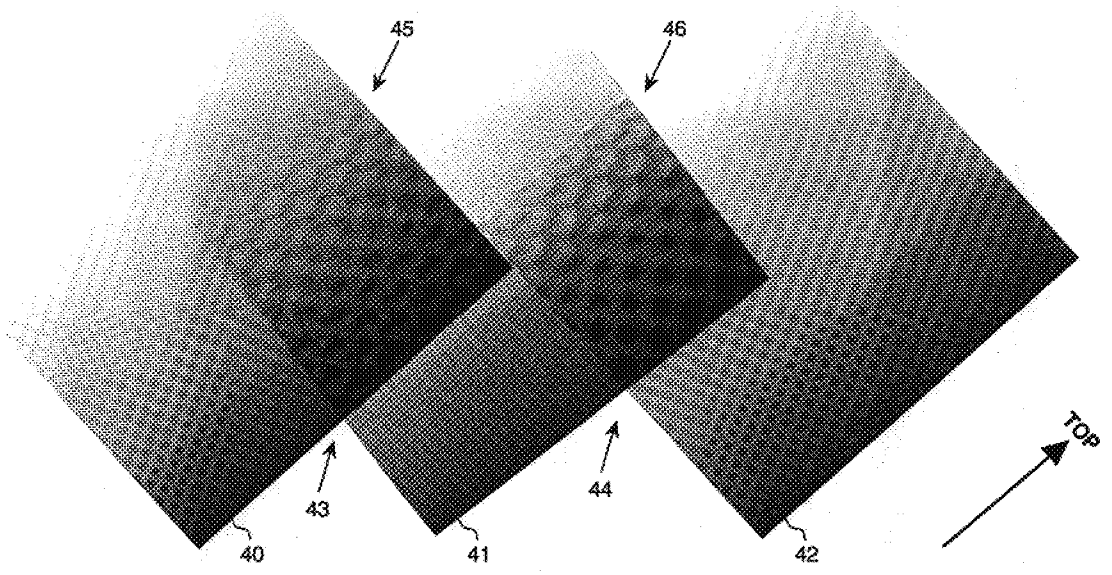
FIG. 4 shows the moire intensity profiles obtained in the superposition of two dot-screens comprising circular black dots of varying sizes and a dot-screen comprising black dots of varying sizes having the shape of the digit "1"

Let us see now how T-convolution fully explains the moire intensity profile forms and the striking visual effects observed in superpositions of dot-screens with any chosen dot shapes, such as in FIG. 3 or FIG. 4. In these figures the moire is obtained by superposing two dot-screens having identical frequencies, with just a small angle difference $\alpha$; this implies that in this case we are dealing, indeed, with a (1,0,−1,0)-moire. In the example of FIG. 4, dot-screen 41 consists of black "1"-shaped dots, and dot-screens 40 and 41 consist of black circular dot shapes. Each of the dot-screens 40, 41 and 42 consists of gradually increasing dots, with identical frequencies, and the superposition angle between the dot-screens is 4 degrees.

Figure 5A:
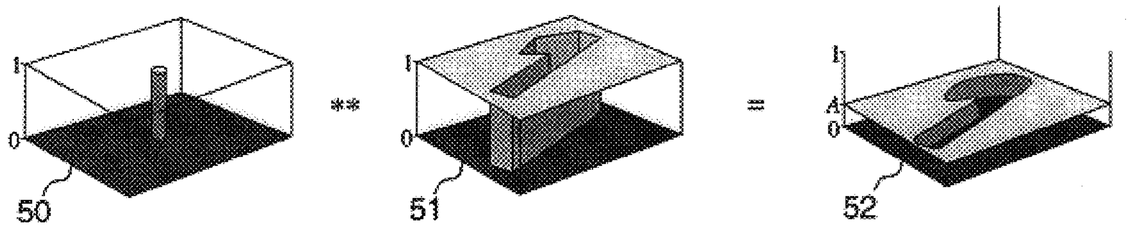
FIG. 5A illustrates how the T-convolution of tiny white dots from one dot-screen with dots of a chosen shape from a second dot-screen gives moire intensity profiles of essentially the same chosen shape.

Case 1: As can be seen in FIG. 4, the form of the moire intensity profiles in the superposition is most clear-cut and striking where one of the two dot-screens is relatively dark (see 43 and 44 in FIG. 4). This happens because the dark screen includes only tiny white dots, which play in the T-convolution the role of very narrow pulses with amplitude 1. As shown in FIG. 5A, the T-convolution of such narrow pulses 50 (from one dot-screen) and dots 51 of any chosen shape (from a second dot-screen) gives dots 52 of the same chosen shape, in which the zero values remain at zero, the 1 values are scaled down to the value A (the volume or the area of the narrow white pulse divided by the total cell area $T_x \cdot T_y$), and the sharp step transitions are replaced by slightly softer ramps. This means that the dot shape received in the normalized moire-period is practically identical to the dot shape of the second screen, except that its white areas turn darker. However, this normalized moire-period is stretched back into the real size of the moire-period $T_M$, as it is determined by Eqs. (5) and (6) (or in our case, according to Eq. (8), by the angle difference $\alpha$ alone, since the sc reen frequencies are fixed; note that the moire period becomes larger as the angle $\alpha$ tends to 0 degrees). This means that the moire intensity profile form in this case is essentially a magnified version of the second screen, where the magnification rate is controlled only by the angle $\alpha$. This magnification property of the moire effect is used in the present invention as a "virtual microscope" for visualizing the detailed structure of the dot-screen printed on the document.

Figure 5B:
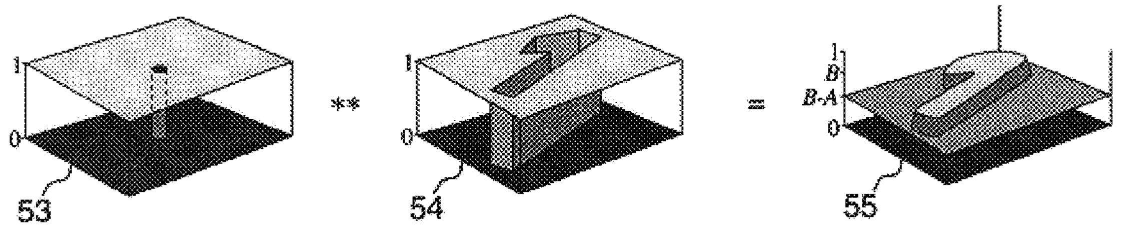
FIG. 5B illustrates how the T-convolution of tiny black dots from one dot-screen with dots of a chosen shape from a second dot-screen gives moire intensity profiles of essentially the same chosen shape, but in inverse video.

Case 2: A related effect occurs in the superposition where one of the two dot-screens contains tiny black dots (see 45 and 46 in FIG. 4). Tiny black dots on a white background can be interpreted as "inversed" pulses of 0-amplitude on a constant background of amplitude 1. As shown in FIG. 5B, the T-convolution of such inversed pulses 53 (from one dot-screen) and dots 54 of any chosen shape (from a second dot-screen) gives dots 55 of the same chosen shape, where the zero values are replaced by the value B (the volume under a one-period cell of the second screen divided by $T_x \cdot T_y$) and the 1 values are replaced by the value B-A (where A is the volume of the "hole" of the narrow black pulse divided by $T_x \cdot T_y$). This means that the dot shape of the normalized moire-period is similar to the dot shape of the second screen, except that it appears in inverse video and with slightly softer ramps. And indeed, as it can be seen in FIG. 4, wherever one of the screens in the superposition contains tiny black dots, the moire intensity profile appears to be a magnified version of the second screen, but this time in inverse video.

Case 3: When none of the two superposed screens contains tiny dots (either white or black), the intensity profile form of the resulting moire is still a magnified version of the T-convolution of the two original screens. This T-convolution gives, as before, some kind of blending between the two original dot shapes, but this time the resulting shape has a rather blurred or smoothed appearance.

The Orientation Of The (1,0,−1,0)-moire Intensity Profiles

Although the (1,0,−1,0)-moire intensity profiles inherit the shapes of the original screen dots, they do not inherit their orientation. Rather than having the same direction as the dots of the original screens (or an intermediate orientation), the moire intensity profiles appear in a perpendicular direction. This fact is explained as follows:

As we have seen, the orientation of the moire is determined by the location of the fundamental impulses of the moire-cluster in the spectrum, i.e. by the location of the basis vectors a and b (Eq. (13)). In the case of the (1,0,−1,0)-moire these vectors are reduced to:

$$a = f_1 - f_3$$

$$b = f_{2-f_4} \qquad (21)$$

And in fact, as it can be seen in FIG. 2C, when the two original dot-screens have the same frequency, these basis vectors are rotated by about 90 degrees from the directions of the frequency vectors $f_i$ of the two original dot-screens. This means that the (1,0,−1,0)-moire cluster (and the moire intensity profile it generates in the image domain) are rotated by about 90 degrees relative to the original dot-screens $f(x,y)$ and $g(x,y)$. Note that the precise period and angle of this moire can be found by formulas (8) which were derived for the (1,−1)-moire between two line-gratings with identical periods T and angle difference of $\alpha$.

Obviously, the fact that the direction of the moire intensity profile is almost perpendicular to the direction of the original dot-screens is a property of the (1,0,−1,0)-moire between two dot-screens having identical frequencies; in other cases the angle of the moire may be different. In all cases the moire angle can be found by Eqs. (5) and (6).

Further details about more complex moires and moires of higher order are disclosed in detail in "Amidror94". In general, in order to obtain a $(k_1,k_2,k_3,k_4)$-moire in the superposition of two dot-screens, the frequencies $f_i$ and the angles $\theta_i$ of the two dot-screens have to be chosen in accordance with Eqs. (5) and (6), so that the frequency of the $(k_1,k_2,k_3,k_4)$-impulse be located close to the origin of the frequency spectrum, within the range of visible frequencies.

Authentication Of Documents By Using The Intensity Profile Of Moire Patterns

The present invention concerns a new method for authenticating documents, which is based on the intensity profile of moire patterns. In one embodiment of the present invention, the moire intensity profiles can be visualized by superposing the basic screen and the master screen which both appear on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the basic screen appears on the document itself, and a microlens array with the same frequency as that of the master screen is used by the human operator or by the apparatus instead of the master screen. An advantage of this third embodiment is that it applies equally well to both transparent support (where the moire is observed by transmittance) and to opaque support (where the moire is observed by reflection). Since the document may be printed on traditional opaque support (such as white paper), this embodiment offers high security without requiring additional costs in the document production.

The method for authenticating documents comprises the steps of:

a) creating on a document a basic screen with a basic screen dot shape;

b) creating a master screen with a master screen dot shape;

c) superposing the master screen and the basic screen, thereby producing a specified moire intensity profile;

d) comparing said moire intensity profile with a prestored moire intensity profile.

In accordance with the third embodiment of this invention, a microlens array with the same frequency as that of the master screen may be used instead of the master screen. Microlens arrays are composed of microlenses arranged for example on a square or a rectangular grid with a chosen frequency (see, for example, "Imaging properties of microlens array systems" by Völkel et al., MOC'95, Hiroshima, Japan, Oct. 18–20, 1995). They have the particularity of enlarging on each grid element only a very small region of the underlying source image, and therefore they behave in a similar manner as screens comprising small white dots, having the same frequency. However, since the substrate between neighboring microlenses in the miicrolens array is transparent and not black, microlens arrays have the advantage of letting the incident light pass through the array. They can therefore be used for producing moire intensity profiles either by reflection or by transmission, and the document including the basic screen may be printed on any support, opaque or transparent.

The comparison in step d) above can be done either by a human operator, or by means of an apparatus described later in the present disclosure. Comparing the moire intensity profile with a prestored moire intensity profile can be made by matching techniques, to which a reference is made in the section "Apparatus for the authentication of documents by using the intensity profile of moire patterns".

The prestored moire intensity profile can be obtained either by image acquisition, for example by a CCD camera, of the superposition of a sample basic screen and a master screen (or a moicrolens array), or it can be obtained by precalculation. The precalculation can be done, as explained earlier in the present disclosure, either in the image domain (by means of a normalized T-convolution of the basic screen and the master screen), or in the spectral domain (by extracting from the convolution of the frequency spectrum of the basic screen and the frequency spectrum of the master screen those impulses describing the $(k_1,k_2,k_3,k_4)$-moire, and by applying to said impulses an inverse Fourier transform). In the case where a microlens array is used instead of a master screen, the frequency spectrum of the microlens array is considered to be the frequency spectrum of the equivalent master screen, having the same frequency and orientation as the microlens array.

In the case where the basic screen is formed as a part of a halftoned image printed on the document, the basic screen will not be distinguishable by the naked eye from other areas on the document. However, when authenticating the document according to the present invention, the moire intensity profile will become immediately apparent.

Any attempt to falsify a document produced in accordance with the present invention by photocopying, by means of a desk-top publishing system, by a photographic process, or by any other counterfeiting method, will inevitably influence (even if slightly) the size or the shape of the tiny screen dots of the basic (or master) screens comprised in the document (for example, due to dot-gain or ink-propagation, as is well known in the art). But since moire effects between superposed dot-screens are very sensitive to any microscopic variations in the screened layers, this makes any document protected according to the present invention practically impossible to counterfeit, and serves as a means to easily distinguish between a real document and a falsified one.

The invention is illucidated by means of the Examples below which are provided in illustrative and non-limiting manner.

Example 1

Basic Screen And Master Screen On Same Document

Consider as a first example a banknote comprising a basic screen with a basic screen dot shape of the digit "1" (like 51 in FIG. 5A). Such a dot-screen can either be generated according to state of the art halftoning methods like the ordered dither methods described in "Digital Halftoning" by R. Ulichney, 1988 (Chapter 5), or by contour based screening methods as disclosed in co-pending U.S. patent application Ser. No. 08/410,767 filed Mar. 27, 1995 (Ostromoukhov, Hersch). It should be noted that the term "dither matrix" used in the present disclosure is equivalent to the term "threshold array" used in "Digital Halftoning" by Ulichney.

In a different area of the banknote a master screen it; printed, for example, with a master screen dot shape of small white dots like 50 in FIG. 5A), giving a dark intensity level. The banknote is printed on a transparent support.

In this example both the basic screen and the master screen are produced with the same dot frequency, and the generated moire is a (1,0,−1,0)-moire. In order that the produced moire intensity profile shapes be upright (90 degrees orientation), the screen dot shapes of the basic and the master screens are required to have an orientation close to 180 degrees (or 0 degrees), according to the explanation given in the section "The orientation of the (1,0,−1,0)-moire intensity profiles" above.

Figure 6:
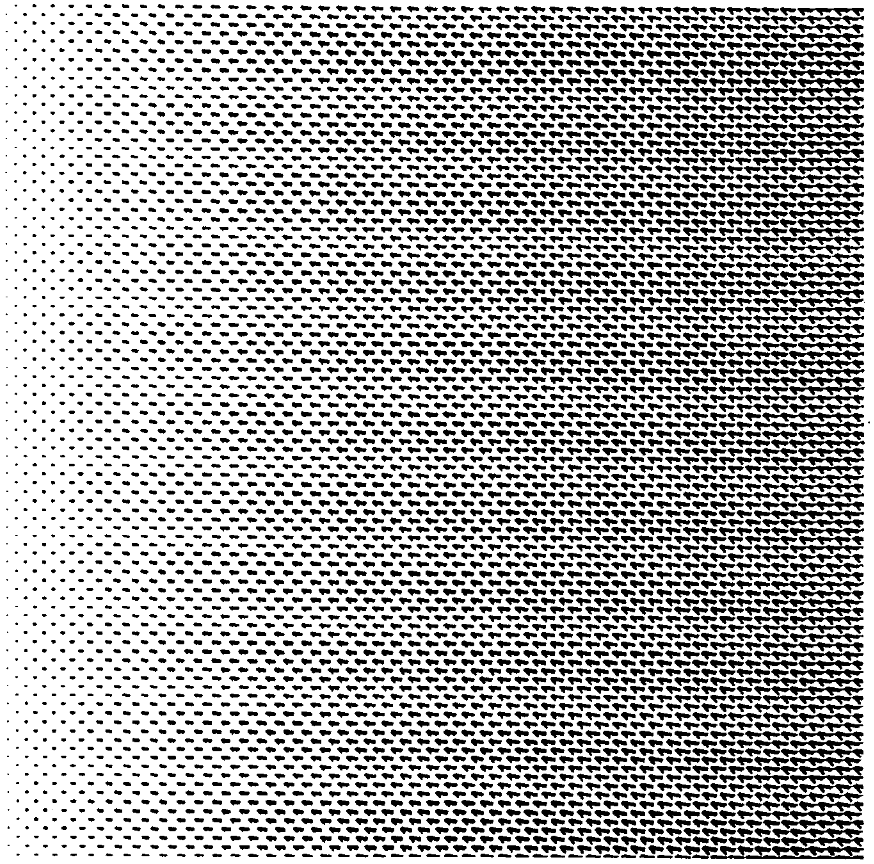
FIG. 6 shows a basic screen comprising black dots of varying sizes having the shape of the digit "1"
Figure 7A:
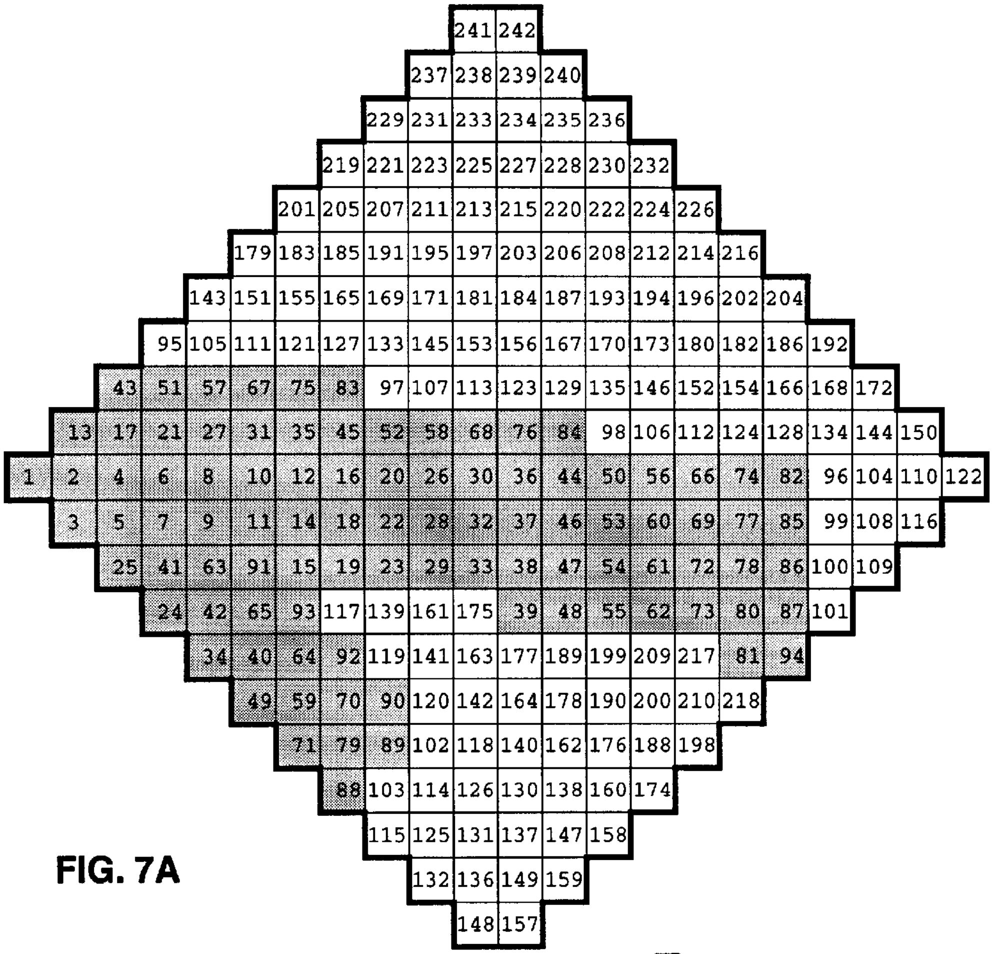
FIG. 7A shows the dither matrix used to generate the basic screen of FIG. 6.
Figure 7B:
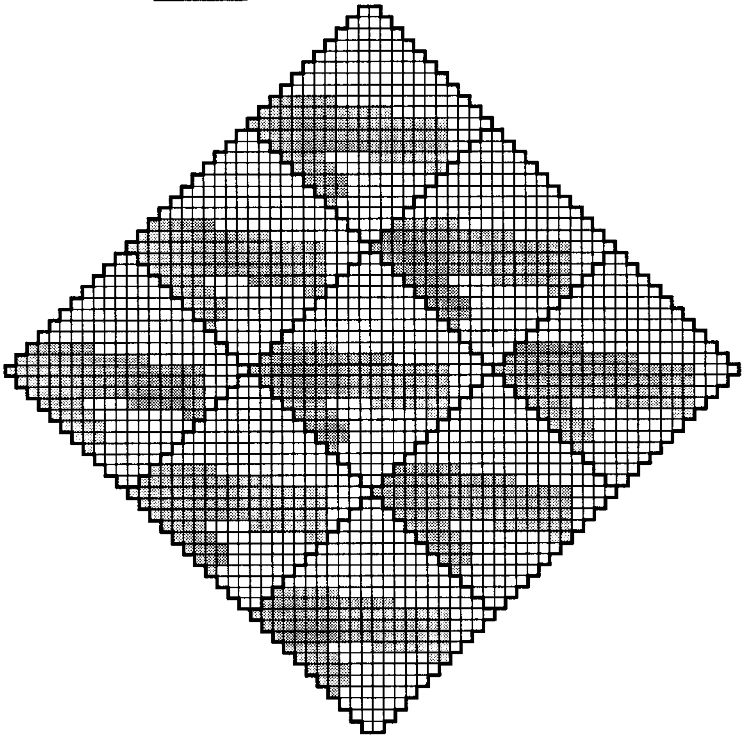
FIG. 7B is a magnified view of a small portion of the basic screen of FIG. 6, showing how it is generated by the dither matrix of FIG. 7A.
Figure 8:
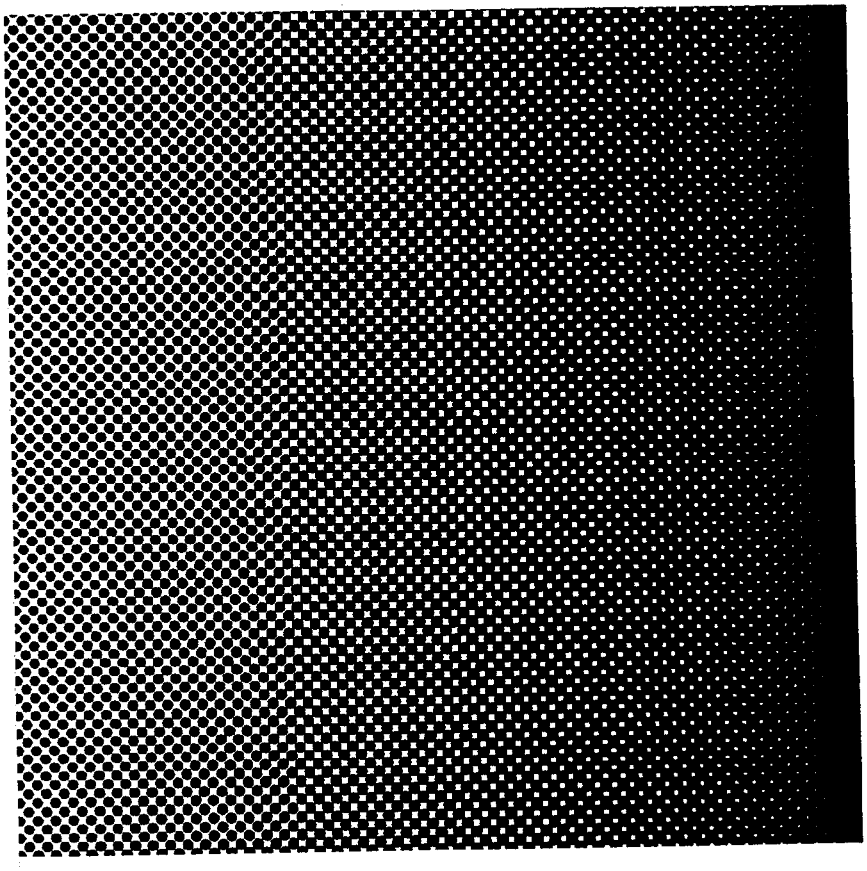
FIG. 8 shows a master screen comprising small white dots of varying sizes.
Figure 9A:
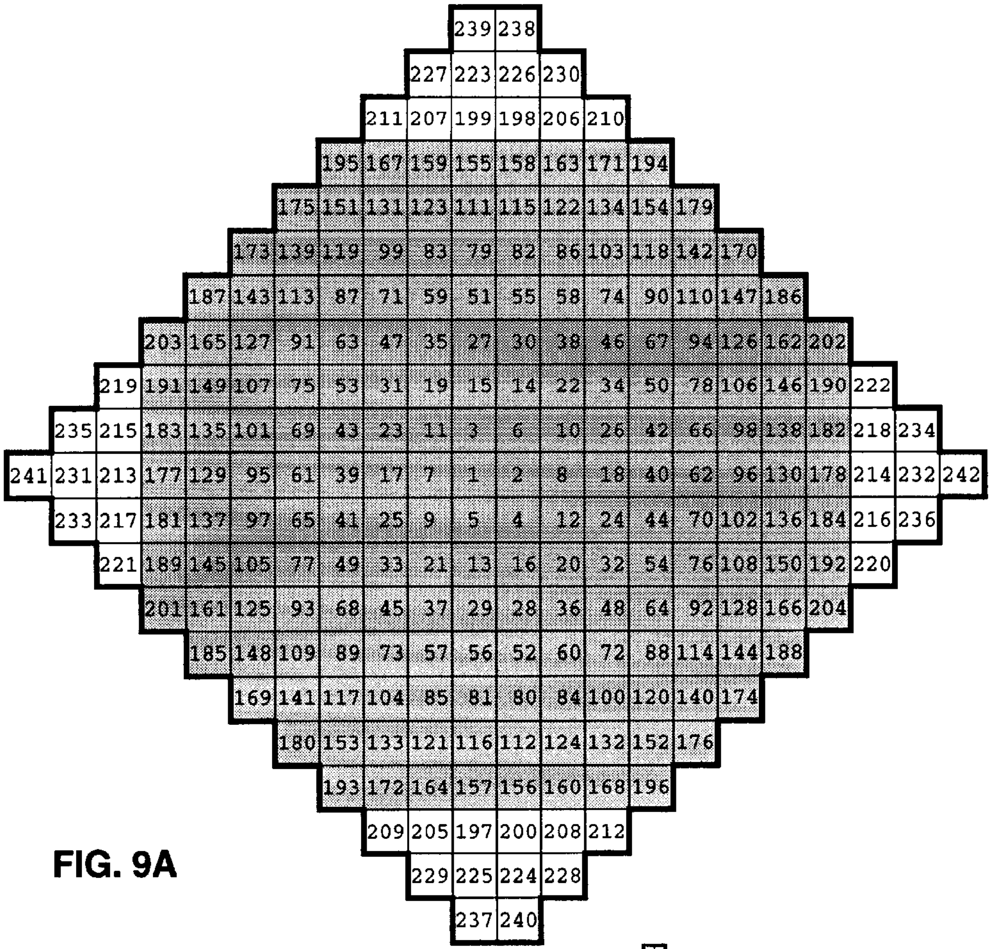
FIG. 9A shows the dither matrix used to generate the master screen of FIG. 8.
Figure 9B:
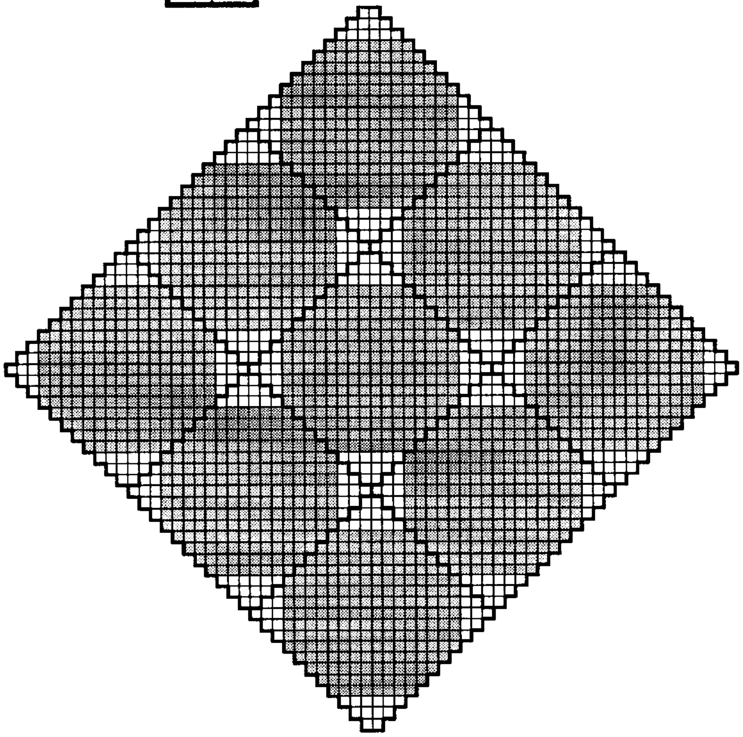
FIG. 9B is a magnified view of a small portion of the master screen of FIG. 8, showing how it is generated by the dither matrix of FIG. 9A.

FIG. 6 shows an example of a basic screen with a basic screen dot shape of the digit "1", which is generated with varying intensity levels using the dither matrix shown in FIG. 7A. FIG. 7B shows a magnified view of a small portion of this basic screen, and how it is built by the dither matrix of FIG. 7A. FIG. 8 shows an example of a master screen which is generated with the dither matrix shown in FIG. 9A (with darker intensity levels than the basic screen, in order to obtain small white dots). FIG. 9B shows a magnified view of a small portion of this master screen, and how it is built by the dither matrix of FIG. 9A. Note that FIG. 6 and FIG. 8 are reproduced here on a 300 dots-per-inch printer in order to show the screen details; on the real banknote the screens will be normally reproduced by a system whose resolution is at least 1270 or 2540 dots-per-inch. The moire intensity profile which is obtained when the basic screen and the master screen are superposed has the form of the digit "1", as shown by 43 in FIG. 4.

Example 2

Basic Screen On Document And Master Screen On Separate Support

As an alternative to Example 1, a banknote may contain a basic screen, which is produced by screen dots of a chosen size and shape (or possibly, by screen dots of varying size and shape, being incorporated in a halftoned image). The banknote is printed on a transparent support. The master screen may be identical to the master screen described in Example 1, but it is not printed on the banknote itself but rather on a separate transparent support, and the banknote can be authenticated by superposing the basic screen of the banknote with the separate master screen. For example, the superposition moire may be visualized by laying the banknote on the master screen, which may be fixed on a transparent sheet of plastic and attached on the top of a box containing a diffuse light source.

Example 3

Basic Screen On Document And Master Screen Replaced By A Microlens Array

In the present example, the basic screen is as in Example 2, but the document is printed on a reflective (opaque) support. Instead of the master screen of Example 2, a microlens array of the same frequency is used. In the case where the basic screen is formed as a part of a halftoned image printed on the document, the basic screen will not be distinguishable by the naked eye from other areas on the document. However, when authenticated under the microlens array, the moire intensity profile will become immediatly apparent. Since the printing of the basic screen on the document is incorporated in the standard printing process, and since the document may be printed on traditional opaque support (such as white paper), this embodiment offers high security without requiring additional costs in the document production.

Apparatus For The Authentication Of Documents By Using The Intensity Profile Of Moire Patterns An apparatus for the visual authentication of documents comprising a basic screen may comprise a master screen prepared in accordance with the present disclosure, which is attached on the top of a box containing a diffuse light source. Instead of the master screen, a microlens array of the same frequency may also be used as part of an apparatus for authenticating such documents. If the authentication is made by visualization, i.e. by a human operator, human biosystems (a human eye and brain) are used as a means for the acquisition of the moire intensity profile produced by the superposition of the basic screen and the master screen (respectively: the microlens array), and as a means for comparing the acquired moire intensity profile with a prestored moire intensity profile.

Figure 10:
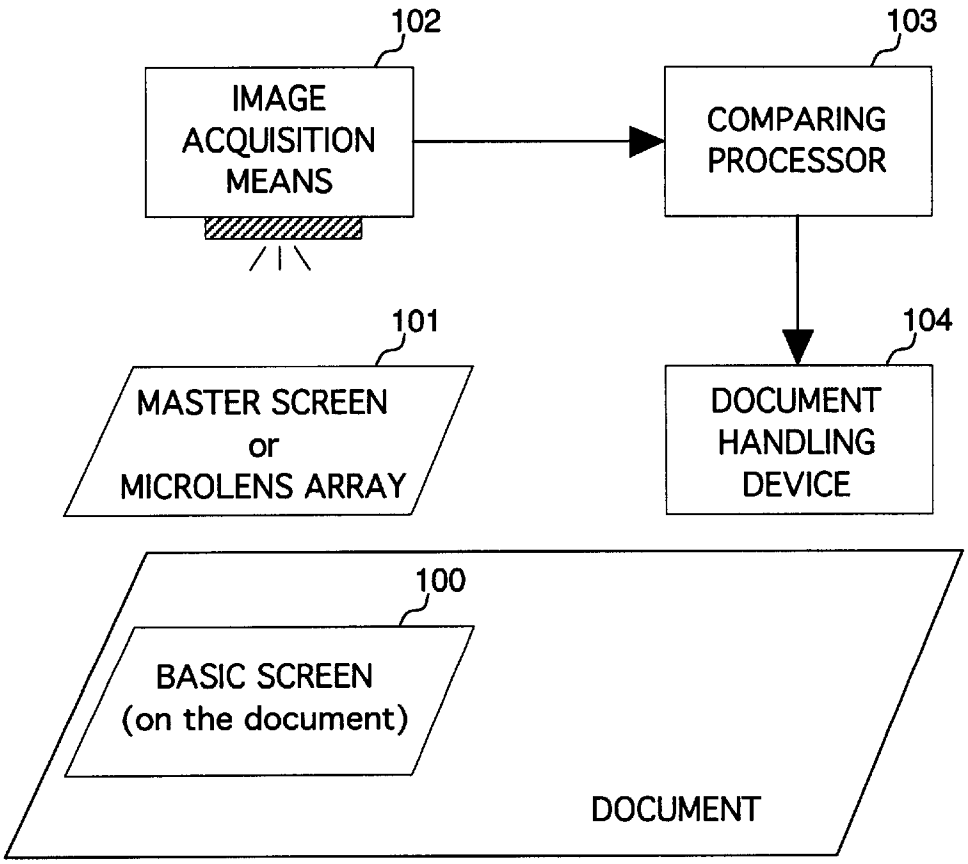
FIG. 10 is a block diagram of an apparatus for the authentication of documents by using the intensity profile of moire patterns.

An apparatus for the automatic authentication of documents, whose block diagram is shown in FIG. 10, comprises a master screen (or a microlens array) 101, an image acquisition means (102) such as a CCD camera and a comparing processor (103) for comparing the acquired moire image with a prestored moire intensity profile. In case the match fails, the document will not be authenticated and the document handling device of the apparatus (104) will reject the document. The comparing processor 103 can be realized by a microcomputer comprising a processor, memory and input-output ports. An integrated one-chip microcomputer can be used for that purpose. For automatic authentication, the image acquisition means 102 needs to be connected to the microprocessor (the comparing processor 103), which in turn controls a document handling device 104 for accepting or rejecting a document to be authenticated, according to the comparison operated by the microprocessor.

The prestored moire intensity profile can be obtained either by image acquisition, for example by means of a CCD camera, of the superposition of a sample basic screen and the master screen (or the microlens array), or it can be obtained by precalculation. The precalculation can be done either in the image domain or in the spectral domain, as explained earlier in the present disclosure.

Image comparision by matching a given image to a prestored image is wen known in the art and described in litterature. For example, template matching as explained in "Digital Image Processing and Computer Vision" by R. J. Schalkoff, 1989, pp. 279–286, can be used for comparision purposes. By way of example, a comparison may produce a matching value giving the degree of proximity between the produced moire intensity profile and the prestored moire intensity profile; this matching value can be used as a criterion for accepting or rejecting the authenticated document.

Advantages Of The Present Invention

The present invention completely differs from methods previously known in the art which use moire effects for the authentication of documents. In such existing methods, the original document is provided with special patterns or elements which when counterfeited by means of halftone reproduction show a moire pattern of high contrast. Similar methods are also used for the prevention of digital photocopying or digital scanning of documents. In all these previously known methods, the presence of moire patterns indicates that the document in question is counterfeit. However, the present invention is unique inasmuch as it takes advantage of the intentional generation of a moire pattern having a particular intensity profile, whose existance and whose shape are used as a means of authentication of the document. The approach on which the present invention is based further differs from that of prior art in that it not only provides full mastering of the qualitative geometric properties of the generated moire (such as its period and its orientation), but it also permits to determine quantitatively the intensity levels of the generated moire.

The fact that moire effects generated between superposed dot-screens are very sensitive to any microscopic variations in the screened layers makes any document protected according to the present invention practically impossible to counterfeit, and serves as a means to easily distinguish between a real document and a falsified one.

A further important advantage of the present invention is that it can be used for authenticating documents printed on any kind of support, including paper, plastic materials, etc., which may be transparent or opaque. Furthermore, the present invented method can be incorporated into the standard document printing process, so that it offers high security at the same cost as standard state of the art document production.

REFERENCES CITED

U.S. Patent Documents

U.S. Pat. No. 5,275,870 (Halope et al.), January 1994. Watermarked plastic support.

U.S. patent application Ser. No. 08/410,767 (Ostromoukhov, Hersch). Method and apparatus for generating halftone images by evolutionary screen dot contours. Filing date: Mar. 27, 1995.

Foreign Patent Documents

United Kingdom Patent No. 1,138,011 (Canadian Bank Note Company), December 1968. Improvements in printed matter for the purpose of rendering counterfeiting more difficult.

OTHER PUBLICATIONS

A Generalized Fourier-Based Method for the Analysis of 2D Moire Envelope-Forms in Screen Superpositions, by I. Amidror; Journal of Modern Optics, Vol. 41, No. 9, 1994; pp.1837–1862.

Making Money by G. Stix; Scientific American, March 1994; pp. 81–83.

Linear Systems, Fourier Transforms, and Optics by J. D. Gaskill, John Wiley & Sons, 1978; pp. 113,314.

Fourier Theorems by D. C. Champeney, Cambridge University Press, 1987; p. 166.

Trigonometric Series Vol. 1 by A. Zygmund, Cambridge University Press, 1968; p. 36.

Digital Halftoning by R. Ulichney, The MIT Press, 1988; Chapter 5.

Digital Image Processing and Computer Vision by R. J. Schalkoff, John Wiley & Sons, 1989, pp.279–286.

Imaging properties of microlens array systems by R. V ölkel et al.; MOC'95, Hiroshima, Japan, Oct. 18–20, 1995.

We claim:

1. A method for authenticating documents by using at least one moire intensity profile, the method comprising the steps of:

a) creating on a document a basic screen with a basic screen dot shape;

b) creating a master screen with a master screen dot shape;

c) superposing the master screen and the basic screen, thereby producing a moire intensity profile; and d) comparing said moire intensity profile with a prestored moire intensity profile.

2. The method of claim 1, where the prestored moire intensity profile is obtained by image acquisition of the superposition of the basic screen and the master screen.

3. The method of claim 1, where the prestored moire intensity profile is obtained by extracting from a convolution of the frequency spectrum of the basic screen and the frequency spectrum of the master screen those impulses describing a $(k_1,k_2,k_3,k_4)$-moire, and by applying to said impulses an inverse Fourier transform.

4. The method of claim 1, where the prestored moire intensity profile is obtained by a normalized T-convolution of the basic screen and the master screen.

5. The method of claim 1, where the basic screen and the master screen are located on a transparent support, and where comparing the moire intensity profile with a prestored moire intensity profile is done by visualization.

6. The method of claim 5, where the basic screen and the master screen are located on two different areas of the same document, thereby enabling the visualization of the moire intensity profile to be performed by superposition of the basic screen and the master screen of said document.

7. A method for authenticating documents by using at least one moire intensity profile, the method comprising the steps of:

a) creating on a document a basic screen with a basic screen dot shape;

b) superposing the basic screen and a microlens array, thereby producing a moire intensity profile; and c) comparing said moire intensity profile with a prestored moire intensity profile.

8. The method of claim 7, where the prestored moire intensity profile is obtained by image acquisition of the superposition of the basic screen and the microlens array.

9. The method of claim 7, where the prestored moire intensity profile is obtained by extracting from a convolution of the frequency spectrum of the basic screen and the frequency spectrum of the microlens array those impulses describing a $(k_1,k_2,k_3,k_4)$-moire, and by applying to said impulses an inverse Fourier transform.

10. The method of claim 7, where the basic screen and the microlens array are located on a transparent support, and where comparing the moire intensity profile with a prestored moire intensity profile is done by visualization.

11. The method of claim 10, where the basic screen and the microlens array are located on two different areas of the same document, thereby enabling the visualization of the moire intensity profile to be performed by superposition of the basic screen and the microlens array of said document.

12. The method of claim 7, where the document comprising the basic screen is printed on an opaque support, thereby allowing the moire intensity profile to be produced by reflection.

13. The method of claim 7, where the basic screen is located on an opaque support, and where comparing the moire intensity profile with a prestored moire intensity profile is done by visualization.

14. An apparatus for authentication of documents making use of at least one moire intensity profile, the apparatus comprising:

a) a master screen;

b) an image acquisition means arranged to acquire a moire intensity profile produced by the superposition of a basic screen located on a document and the master screen; and c) a comparing means operable for comparing the acquired moire intensity profile with a prestored moire intensity profile.

15. The apparatus of claim 14, where the image acquisition means and comparing means are human biosystems, a human eye and brain respectively.

16. The apparatus of claim 14, where the comparing means is a comparing processor controlling a document handling device accepting, respectively rejecting a document to be authenticated, according to the comparison operated by the comparing processor.

17. The apparatus of claim 16, where the comparing processor is a microcomputer comprising a processor, memory and input-output ports and where the image acquisition means is a CCD camera connected to said microcomputer.

18. An apparatus for authentication of documents making use of at least one moire intensity profile, the apparatus comprising:

a) a microlens array;

b) an image acquisition means arranged to acquire a moire intensity profile produced by the superposition of a basic screen located on a document and the mnicrolens array; and c) a comparing means operable for comparing the acquired moire intensity profile with a prestored moire intensity profile.

19. The apparatus of claim 18, where the image acquisition means and comparing means are human biosystems, a human eye and brain respectively.

20. The apparatus of claim 18, where the comparing means is a comparing processor controlling a document handling device accepting, respectively rejecting a document to be authenticated, according to the comparison operated by the comparing processor.

21. The apparatus of claim 20, where the comparing processor is a microcomputer comprising a processor, memory and input-output ports and where the image acquisition means is a CCD camera connected to said microcomputer.

22. A method for authenticating documents by using at least one moire intensity profile, the method comprising the steps of:

a) creating on a document a basic screen with a basic screen dot shape;

b) creating a master screen with a master screen dot shape;

c) superposing the master screen and the basic screen, thereby producing a moire intensity profile; and d) comparing said moire intensity profile with a prestored moire intensity profile;

where the produced moire intensity profile is a normalized T-convolution of the basic screen and of the master screen and where the orientation and period of the produced moire intensity profile are determined by the orientations and periods of the basic screen and of the master screen.

23. The method of claim 22, where the prestored moire intensity profile is obtained by image acquisition of the superposition of the basic screen and the master screen.

24. The method of claim 22, where the master screen contains tiny dots and where the moire intensity profile is a magnified and rotated version of the basic screen dot shape.

25. The method of claim 22, where the basic screen and the master screen are located on a transparent support, and where comparing the moire intensity profile with a prestored moire intensity profile is done by visualization.

26. The method of claim 22, where the basic screen and the master screen are located on two different areas of the same document, thereby enabling the visualization of the moire intensity profile to be performed by superposition of the basic screen and the master screen of said document.

27. A method for authenticating documents by using at least one moire intensity profile, the method comprising the steps of:

a) creating on a document a basic screen with a basic screen dot shape;

b) superposing the basic screen and a microlens array, thereby producing a moire intensity profile; and c) comparing said moire intensity profile with a prestored moire intensity profile;

where the orientation and period of the aquired moire intensity profile are determined by the orientations and periods of the basic screen and of the microlens array.

28. The method of claim 27, where the prestored moire intensity profile is obtained by image acquisition of the superposition of the basic screen and the microlens array.

29. The method of claim 27, where the basic screen and the mnicrolens array are located on a transparent support, and where comparing the moire intensity profile with a prestored moire intensity profile is done by visualization.

30. The method of claim 29, where the basic screen and the microlens array are located on two different areas of the same document, thereby enabling the visualization of the moire intensity profile to be performed by superposition of the basic screen and the microlens array of said document.

31. The method of claim 27, where the document comprising the basic screen is printed on an opaque support, thereby allowing the moire intensity profile to be produced by reflection.

32. The method of claim 27, where the basic screen is located on an opaque support, and where comparing the moire intensity profile with a prestored moire intensity profile is done by visualization.

33. An apparatus for authentication of documents making use of at least one moire intensity profile, the apparatus comprising:

a) a master screen;

b) an image acquisition means arranged to acquire a moire intensity profile produced by the superposition of a basic screen located on a document and the master screen; and c) a comparing means operable for comparing the acquired moire intensity profile with a prestored moire intensity profile;

where the produced moire intensity profile is a normalized T-convolution of the basic screen and of the master screen and where the orientation and period of the produced moire intensity profile are determined by the orientations and periods of the basic screen and of the master screen.

34. The apparatus of claim 33, where the image acquisition means and comparing means are human biosystems, a human eye and brain respectively.

35. The apparatus of claim 33, where the comparing means is a microcomputer comprising a processor, memory and input-output ports, where the image acquisition means is a CCD camera connected to said microcomputer and where said microcomputer controls a document handling device accepting, respectively rejecting a document to be authenticated, according to the operated comparison.

36. An apparatus for authentication of documents making use of at least one moire intensity profile, the apparatus comprising:

a) a microlens array;

b) an image acquisition means arranged to acquire a moire intensity profile produced by the superposition of a basic screen located on a document and the microlens array; and c) a comparing means operable for comparing the acquired moire intensity profile with a prestored moire intensity profile;

where the orientation and period of the aquired moire intensity profile are determined by the orientations and periods of the basic screen and of the microlens array.

37. The apparatus of claim 36, where the image acquisition means and comparing means are human biosystems, a human eye and brain respectively.

38. The apparatus of claim 36, where the comparing means is a microcomputer comprising a processor, memory and input-output ports, where the image acquisition means is a CCD camera connected to said microcomputer and where said microcomputer controls a document handling device accepting, respectively rejecting a document to be authenticated, according to the operated comparison.

39. A method for authenticating documents by using at least one moire intensity profile, the method comprising the steps of:

a) creating on a document a basic screen with a basic screen dot shape;

b) creating a master screen with a master screen dot shape; and c) superposing the master screen and the basic screen, thereby producing a moire intensity profile which is apparent to a human eye.

40. A method for authenticating documents by using at least one moire intensity profile, the method comprising the steps of:

a) creating on a document a basic screen with a basic screen dot shape; and b) superposing the basic screen and a microlens array, thereby producing a moire intensity profile which is apparent to a human eye.

* * * * *

UNITED STATES PATENT AND TRADEMARK OFFICE

CERTIFICATE OF CORRECTION

PATENT NO. : 6,249,588 B1
DATED : June 19, 2001
INVENTOR(S) : Isaac Amidror, Roger D. Hersch It is certified that error appears in the above-identified patent and that said Letters Patent is hereby corrected as shown below:

Title page,
Item [56], change "Linear Systems, *Fourier Transforms, and Optics*" to -- *Linear Systems, Fourier Transforms, and Optics* --.

Column 3,
Line 3, change "Modem" to -- Modern --.

Column 5,
Equation (4), change "$\alpha_{k_1,k_2,\ldots,k_m}=\alpha^{(1)}{}_{k_1}\alpha^{(2)}{}_{k_2}\ldots\alpha^{(m)}{}_{k_m}$" to:

$--a_{k_1,k_2,\ldots,k_m}=a^{(1)}{}_{k_1}a^{(2)}{}_{k_2}\ldots a^{(m)}{}_{k_m}--$.

Column 5,
Line 41, change "$\alpha^{(i)}{}_{k_i}$" to $--a^{(i)}{}_{k_i}--$.

Column 6,
First line of Equation (5), change "$f_u k_1,k_2,\ldots,k_m$" to $--f_{u\ k_1,k_2,\ldots,k_m}--$.

Second line of Equation (5), change "$f_v k_1,k_2,\ldots,k_m$" to $--f_{v\ k_1,k_2,\ldots,k_m}--$.

Line 12, change "follows:" to -- as follows: --

Column 7,
Line 27, change "$\alpha_{nk_i,nk_2}$" to $--a_{nk_1,nk_2}--$.

Line 29, change "$\alpha^{(1)}{}_{nk_i}\alpha^{(2)}{}_{nk_2}$" to $--a^{(1)}{}_{nk_1}a^{(2)}{}_{nk_2}--$.

Line 31, change "$\alpha^{(1)}{}_i$ *and* $\alpha^{(2)}{}_i$" and to -- $a^{(1)}{}_i$ and $a^{(2)}{}_i$ --.

Line 41, change "$c_n=\alpha_{n,-n}=\alpha^{(1)}{}_n\alpha^{(2)}{}_{-n}$" to -- $c_n=a_{n,,-n}=a^{(1)}{}_n a^{(2)}{}_{-n}$ --.

Line 50, change "Letf(x)" to -- Let *f*(x) --

UNITED STATES PATENT AND TRADEMARK OFFICE
CERTIFICATE OF CORRECTION

PATENT NO. : 6,249,588 B1
DATED : June 19, 2001
INVENTOR(S) : Isaac Amidror, Roger D. Hersch It is certified that error appears in the above-identified patent and that said Letters Patent is hereby corrected as shown below:

Column 10,
Equation (12), change "$=f^{-1}$" to -- $=F^{1}$ --.

First line of Equation (13), change "$+f_3f_3+l_4f_4$" to -- $+k_3f_3+k_4f_4$ --
Second line of Equation (13), change "$b=K_2f_1$" to -- $b=k_2f_1$ --.
Line 57, change "$L_m(u,v)$" to -- $L_M(u,v)$ --.

Column 11,
Equation (16), change "$\alpha$" to -- $=a$ --.
Equation (16), change the erroneously printed subscript to the subscript:
-- $ik_1$-j$k_2$, $ik_2+jk_1$, $ik_3$-j$k_4$, $ik_4+jk_3$ --
Equation (17), change the four occurrences of "α" to four occurrences of -- $a$ --.
Equation (17), change the four erroneously printed subscripts to the four subscripts:
-- $ik_1$-$jk_2$ --, -- $ik_2+jk_1$ --, -- $ik_3$-$jk_4$ -- and -- $ik_4+jk_3$ --, respectively.
Equation (18), change the two occurrences of "$\alpha$" to two occurrences of -- $a$ --.
Equation (18), change the two erroneously printed subscripts to the two subscripts:
-- $ik_1$-$jk_2$, $ik_2+jk_1$ --, -- $ik_3$-$jk_4$, $ik_4+jk_3$ --, respectively.
Line 49, change "$c_{i,j} = \alpha^{(f)}{}_{ij}\,\alpha^{(g)}{}_{-i,-j}$" to -- $c_{i,j} = a^{(f)}i,ja^{(g)}\text{-}i,\text{-}j$ --.
Line 54, change the two occurrences of "α" in the equation to two occurrences of -- $a$ --.

Column 12,
Line 28, change "off" to -- of $f$ --.
Line 63, change "$c_{i,j} = \alpha^{(f)}{}_{i,j}\,\alpha^{(g)}{}_{-i,-j}$" to -- $c_{i,j} = a^{(f)}{}_{i,j}a^{(g)}\text{-}i,\text{-}j$ --.

Column 13,
Line 39, change "sc reen" to -- screen --.
Line 52, change "1" to -- 1 --.

Column 14,
Second line of Equation (21), change "$f_{2\text{-}f4}$" to -- $\mathbf{f}_2$-$\mathbf{f}_4$ --.

Column 15,
Line 31, change "miicrolens" to -- microlens --.

UNITED STATES PATENT AND TRADEMARK OFFICE
CERTIFICATE OF CORRECTION

PATENT NO. : 6,249,588 B1
DATED : June 19, 2001
INVENTOR(S) : Isaac Amidror, Roger D. Hersch It is certified that error appears in the above-identified patent and that said Letters Patent is hereby corrected as shown below:

Column 16,
Line 32, change "it;" to -- is --.

Column 18,
Line 9, change "wen" to -- well --.

Column 19,
Line 20, change "R. V ölkel" to -- R. Völkel --.

Signed and Sealed this

Twelfth Day of March, 2002

Attest:

JAMES E. ROGAN

*Attesting Officer*

*Director of the United States Patent and Trademark Office*